US012651606B2

(12) United States Patent
Luo et al.

(10) Patent No.: US 12,651,606 B2
(45) Date of Patent: Jun. 9, 2026

(54) METHOD AND APPARATUS FOR EXTRACTING FEATURE REPRESENTATION, DEVICE, MEDIUM, AND PROGRAM PRODUCT

(71) Applicant: Tencent Technology (Shenzhen) Company Limited, Shenzhen (CN)

(72) Inventors: Yi Luo, Shenzhen (CN); Jianwei Yu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 166 days.

(21) Appl. No.: 18/399,399

(22) Filed: Dec. 28, 2023

(65) Prior Publication Data

US 2024/0321289 A1 Sep. 26, 2024

Related U.S. Application Data

(63) Continuation of application No. PCT/CN2023/083745, filed on Mar. 24, 2023.

(30) Foreign Application Priority Data

May 25, 2022 (CN) ........................ 202210579959.X

(51) Int. Cl.
*G10L 25/18* (2013.01)

(52) U.S. Cl.
CPC .................................... *G10L 25/18* (2013.01)

(58) Field of Classification Search
CPC ..... G10L 25/18; G10L 25/06; G10L 21/0272; G10L 25/30; G10L 25/03
See application file for complete search history.

(56) References Cited

U.S. PATENT DOCUMENTS

2011/0191101 A1 8/2011 Uhle et al.
2014/0088978 A1* 3/2014 Mundt .................. G10L 21/038 704/500
(Continued)

FOREIGN PATENT DOCUMENTS

CN 108766461 A 11/2018
CN 111477250 A 7/2020
(Continued)

OTHER PUBLICATIONS

Tencent Technology, WO+IPRP, PCT/CN2023/083745, Nov. 7, 2024, 5 pgs.
(Continued)

*Primary Examiner* — Abul K Azad
(74) *Attorney, Agent, or Firm* — Morgan, Lewis & Bockius LLP

(57) ABSTRACT

A method and an apparatus for extracting a feature representation, a device, a medium, and a program product are provided and relate to the field of voice analysis technologies. The method includes: obtaining sample audio; extracting a sample time-frequency feature representation corresponding to the sample audio; performing frequency band segmentation on the sample time-frequency feature representation from a frequency domain dimension, to obtain time-frequency sub-feature representations respectively corresponding to at least two frequency bands; and performing inter-frequency band relationship analysis on the time-frequency sub-feature representations respectively corresponding to the at least two frequency bands from the frequency domain dimension, and obtaining an application time-frequency feature representation based on an inter-frequency band relationship analysis result.

20 Claims, 7 Drawing Sheets

(56) References Cited

U.S. PATENT DOCUMENTS

| | | | | |
|---|---|---|---|---|
| 2018/0034599 | A1* | 2/2018 | Zhou | H04W 56/0005 |
| 2018/0206039 | A1* | 7/2018 | Vilermo | H04S 7/30 |
| 2025/0037706 | A1* | 1/2025 | McCallum | G06N 3/045 |

FOREIGN PATENT DOCUMENTS

| | | | |
|---|---|---|---|
| CN | 111524536 | A | 8/2020 |
| CN | 111899760 | A | 11/2020 |
| CN | 113450822 | A | 9/2021 |
| CN | 113744756 | A | 12/2021 |
| CN | 114242043 | A | 3/2022 |
| CN | 115116469 | A | 9/2022 |
| EP | 3264799 | A1 | 6/2017 |
| WO | WO 2020245970 | A1 | 12/2020 |
| WO | WO 2021252823 | A1 | 12/2021 |

OTHER PUBLICATIONS

Tencent Technology, Extended European Search Report, EP Patent Application No. 23810647.0, Apr. 29, 2025, 13 pgs.

Alexander Schasse et al., "Efficient Estimation of Inter-Subband Speech Correlations", 2016 IEEE International Conference on Acoustics, Speech and Signal Processing (ICASSP), Mar. 2016, 5 pgs.

Bo Peng et al., "An Improved Solution to the Subband Blind Source Separation Permutation Problem Based on Optimized Filter Banks", 2010 4th International Symposium on Communications, Control and Signal Processing (ISCCSP), Mar. 2010, 4 pgs.

Yi Luo et al., "Ultra-Lightweight Speech Separation Via Group Communication", ICASSP 2021-2021 IEEE International Conference on Acoustics, Speech and Signal Processing (ICASSP), Jun. 2021, 5 pgs.

Tencent Technology, ISR, PCT/CN2023/083745, Jul. 3, 2023, 3 pgs.

* cited by examiner

METHOD AND APPARATUS FOR EXTRACTING FEATURE REPRESENTATION, DEVICE, MEDIUM, AND PROGRAM PRODUCT

CROSS-REFERENCE TO RELATED APPLICATIONS

This application is a continuation application of PCT Patent Application No. PCT/CN2023/083745, entitled "METHOD AND APPARATUS FOR EXTRACTING FEATURE REPRESENTATION, DEVICE, MEDIUM, AND PROGRAM PRODUCT" filed on Mar. 24, 2023, which claims priority to Chinese Patent Application No. 202210579959.X, entitled "METHOD AND APPARATUS FOR EXTRACTING FEATURE REPRESENTATION, DEVICE, MEDIUM, AND PROGRAM PRODUCT" and filed on May 25, 2022, all of which is incorporated herein by reference in its entirety.

FIELD OF THE TECHNOLOGY

Embodiments of this application relate to the field of voice analysis technologies, and in particular, to a method and an apparatus for extracting a feature representation, a device, a medium, and a program product.

BACKGROUND OF THE DISCLOSURE

Audio is an important medium in a multimedia system. When the audio is analyzed, content and performance of the audio are analyzed by using a plurality of analysis methods such as time domain analysis, frequency domain analysis, and distortion analysis by measuring various audio parameters.

In a related art, a time domain feature corresponding to the audio is generally extracted in a time domain dimension, and the time domain feature corresponding to the audio is analyzed according to a sequence distribution status of the time domain feature on a full frequency band in the audio in the time domain dimension.

When the audio is analyzed by using the foregoing methods, a feature of the audio in a frequency domain dimension is not considered, and when a frequency band corresponding to the audio is relatively wide, a calculation amount for analyzing the time domain feature on the full frequency band in the audio is excessively large, resulting in low analysis efficiency and poor analysis accuracy of the audio.

SUMMARY

Embodiments of this application provide a method and an apparatus for extracting a feature representation, a device, a medium, and a program product, which can obtain an application time-frequency feature representation having inter-frequency band relationship information, and further perform a downstream analysis processing task with better performance on sample audio. The technical solutions are as follows.

In an aspect, a method for extracting a feature representation is provided, including:

- obtaining sample audio;
- performing feature extraction on the sample audio from a time domain dimension and a frequency domain dimension to obtain a sample time-frequency feature representation corresponding to the sample audio;
- performing frequency band segmentation on the sample time-frequency feature representation to obtain time-frequency sub-feature representations respectively corresponding to at least two frequency bands; and
- performing inter-frequency band relationship analysis on the time-frequency sub-feature representations respectively corresponding to the at least two frequency bands to obtain an application time-frequency feature representation, the application time-frequency feature representation being a feature representation applicable to a downstream analysis processing of the sample audio.

In another aspect, an apparatus for extracting a feature representation is provided, including:

- an obtaining module, configured to obtain sample audio;
- an extraction module, configured to perform feature extraction on the sample audio from a time domain dimension and a frequency domain dimension to obtain a sample time-frequency feature representation corresponding to the sample audio;
- a segmentation module, configured to perform frequency band segmentation on the sample time-frequency feature representation to obtain time-frequency sub-feature representations respectively corresponding to at least two frequency bands; and
- an analysis module, configured to perform inter-frequency band relationship analysis on the time-frequency sub-feature representations respectively corresponding to the at least two frequency bands to obtain an application time-frequency feature representation, the application time-frequency feature representation being a feature representation applicable to a downstream analysis processing of the sample audio.

In another aspect, a computer device is provided, including a processor and a memory, the memory storing at least one instruction, at least one program, a code set, or an instruction set, and the at least one instruction, the at least one program, the code set, or the instruction set being loaded and executed by the processor to implement the method for extracting a feature representation according to any one of the foregoing embodiments.

In another aspect, a non-transitory computer-readable storage medium is provided, having at least one segment of program code stored therein, the program code being loaded and executed by a processor, to implement the method for extracting a feature representation according to any one of the foregoing embodiments.

In another aspect, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the method for extracting a feature representation described in any one of the foregoing embodiments.

The technical solutions provided in the embodiments of this application may include the following beneficial effects:

After a sample time-frequency feature representation corresponding to sample audio is extracted, frequency band segmentation is performed on the sample time-frequency feature representation from a frequency domain dimension, to obtain time-frequency sub-feature representations respectively corresponding at least two frequency bands, so that an application time-frequency feature representation is obtained based on an inter-frequency band relationship analysis result. The frequency band segmentation process of fine granularity is performed on the sample time-frequency feature representation from the frequency domain dimension, to overcome an analysis difficulty caused by an excessively large frequency band width in a case of a wide frequency band, and an inter-frequency band relationship analysis process is also performed on the time-frequency sub-feature representations respectively corresponding to the at least two frequency bands obtained through segmentation, to cause the application time-frequency feature representation obtained based on the inter-frequency band relationship analysis result to have inter-frequency band relationship information, so that when a downstream analysis processing task is performed on the sample audio by using the application time-frequency feature representation, an analysis result with better performance can be obtained, thereby effectively expanding an application scenario of the application time-frequency feature representation.

DESCRIPTION OF EMBODIMENTS

In a related art, a time domain feature corresponding to audio is generally extracted in a time domain dimension, and the time domain feature corresponding to the audio is analyzed according to a sequence distribution status of the time domain feature on a full frequency band in the audio in the time domain dimension. When the audio is analyzed by using the foregoing methods, a feature of the audio in a frequency domain dimension is not considered, and when a frequency band corresponding to the audio is relatively wide, a calculation amount for analyzing the time domain feature on the full frequency band in the audio is excessively large, resulting in low analysis efficiency and poor analysis accuracy of the audio.

Embodiments of this application provide a method for extracting a feature representation, which obtains an application time-frequency feature representation having inter-frequency band relationship information, and further performs a downstream analysis processing task with better performance on sample audio. For the method for extracting a feature representation trained in this application, there are a plurality of voice processing scenarios such as an audio separation scenario and an audio enhancement scenario during application. The application scenarios are merely examples. The method for extracting a feature representation provided in this embodiment is further applicable to another scenario. This is not limited in this embodiment of this application.

Information (including, but not limited to, user equipment information, user personal information, and the like), data (including, but not limited to, data for analysis, data for storage, data for display, and the like), and a signal involved in this application are all authorized by a user or fully authorized by all parties, and collection, use, and processing of the related data need to comply with related laws, regulations, and standards of related countries and regions. For example, audio data involved in this application is obtained with full authorization.

Figure 1:
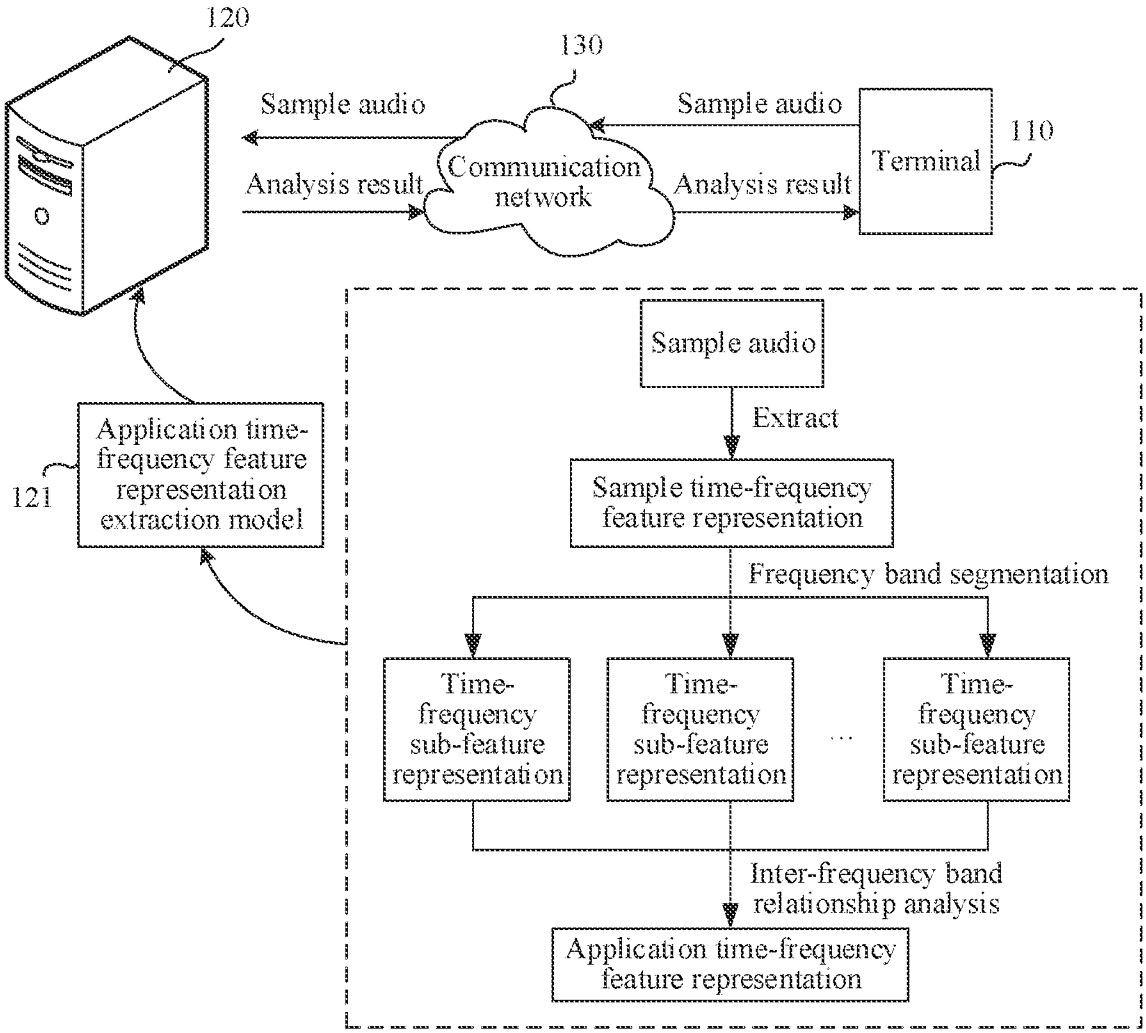
FIG. 1 is a schematic diagram of an implementation environment according to an exemplary embodiment of this application.

An implementation environment involved in the embodiments of this application is described. For example, referring to FIG. 1, the implementation environment includes a terminal 110 and a server 120, the terminal 110 being connected to the server 120 through a communication network 130.

In some embodiments, the terminal 110 is configured to send sample audio to the server 120. In some embodiments, an application having an audio obtaining function is installed in the terminal 110, to obtain the sample audio.

The method for extracting a feature representation provided in the embodiments of this application may be independently performed by the terminal 110, or may be performed by the server 120, or may be implemented through data exchange between the terminal 110 and the server 120. This is not limited in the embodiments of this application. In this embodiment, after obtaining the sample audio through the application having the audio obtaining function, the terminal 110 sends the obtained sample audio to the server 120. For example, an example in which the server 120 analyzes the sample audio is used for description.

In some embodiments, after receiving the sample audio sent by the terminal 110, the server 120 constructs an application time-frequency feature representation extraction model 121 based on the sample audio. In the application time-frequency feature representation extraction model 121, a sample time-frequency feature representation corresponding to the sample audio is first extracted, the sample time-frequency feature representation being a feature representation obtained by performing feature extraction on the sample audio from a time domain dimension and a frequency domain dimension. Then the server 120 performs frequency band segmentation on the sample time-frequency feature representation from the frequency domain dimension, to obtain time-frequency sub-feature representations respectively corresponding to at least two frequency bands, and performs inter-frequency band relationship analysis on the time-frequency sub-feature representations respectively corresponding to the at least two frequency bands from the frequency domain dimension, to obtain an application time-frequency feature representation based on an inter-frequency band relationship analysis result. The foregoing is an example construction method of the application time-frequency feature representation extraction model 121.

In some embodiments, after the application time-frequency feature representation is obtained, the application time-frequency feature representation is configured for a downstream analysis processing task applicable to the sample audio. For example, the application time-frequency feature representation extraction model 121 configured to obtain the application time-frequency feature representation is applicable to an audio processing task such as a music separation task or a voice enhancement task, so that the sample audio is processed more accurately, thereby obtaining an audio processing result with better quality.

In some embodiments, the server 120 sends the audio processing result to the terminal 110, and the terminal 110 receives, plays, and displays the audio processing result.

The terminal includes, but not limited to, a mobile terminal such as a mobile phone, a tablet computer, a portable laptop computer, an intelligent voice exchange device, an intelligent appliance, or a vehicle terminal, or may be implemented as a desktop computer, or the like. The server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

The cloud technology is a hosting technology that unifies a series of resources such as hardware, software, and networks in a wide area network or a local area network to implement computing, storage, processing, and sharing of data.

Figure 2:
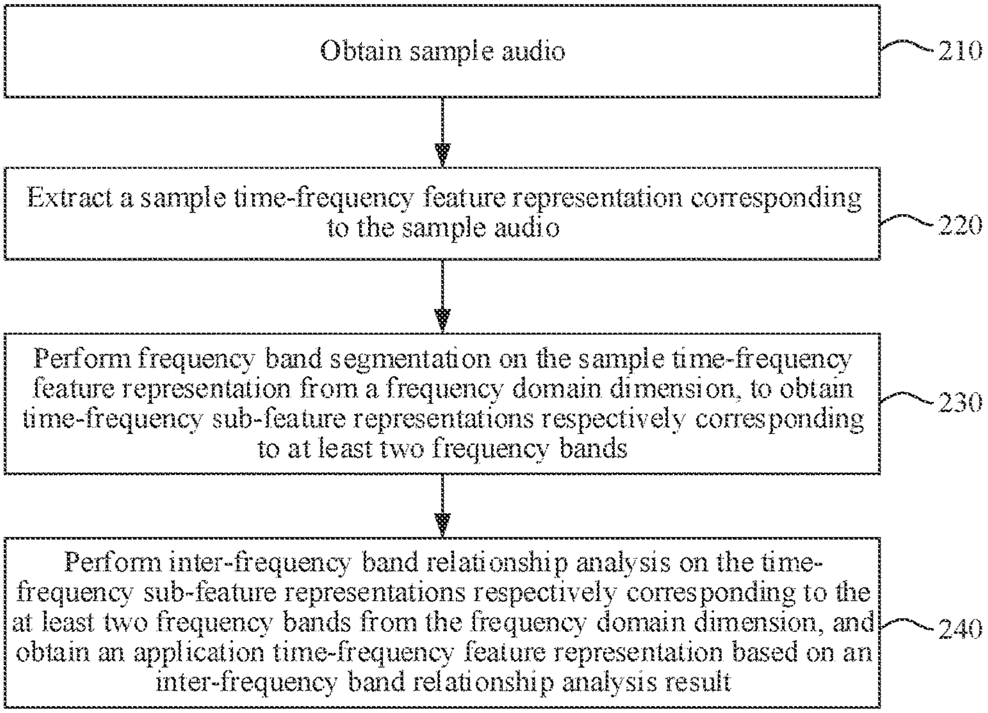
FIG. 2 is a flowchart of a method for extracting a feature representation according to an exemplary embodiment of this application.

With reference to the foregoing descriptions of terms and application scenarios, the method for extracting a feature representation provided in the embodiments of this application is described. An example in which the method is applicable to the server. As shown in FIG. 2, the method includes the following step 210 to step 240.

Step 210. Obtain sample audio.

For example, audio is configured for indicating data having audio information, for example, a piece of music or a piece of voice message. In some embodiments, the audio is obtained by using a built-in or external voice acquisition component such as a terminal or a voice recorder. For example, the audio is obtained by using a terminal equipped with a microphone, a microphone array, or an audio monitoring unit. Alternatively, the audio is synthesized by using an audio synthesis application, and the audio is obtained.

In some embodiments, the sample audio is audio data obtained in the acquisition manner or synthesis manner.

Step 220. Extract a sample time-frequency feature representation corresponding to the sample audio.

The sample time-frequency feature representation is a feature representation obtained by performing feature extraction on the sample audio from a time domain dimension and a frequency domain dimension, the time domain dimension is a dimension in which a signal change occurs in the sample audio over time, and the frequency domain dimension is a dimension in which a signal change occurs in the sample audio in frequency.

For example, the time domain dimension is a dimension in which a time scale is configured for recording a change of the sample audio over time. The frequency domain dimension is a dimension configured for describing a feature of the sample audio in frequency.

In some embodiments, after the sample audio is analyzed in the time domain dimension, a sample time domain feature representation corresponding to the sample audio is determined. After the sample audio is analyzed in the frequency domain dimension, a sample frequency domain feature representation corresponding to the sample audio is determined. However, considering that when feature extraction is performed on the sample audio from the time domain dimension or the frequency domain dimension, information about the sample audio can be calculated from only one domain. Therefore, an important feature with high resolution is easily discarded.

For example, after the sample audio is analyzed from the time domain dimension, the sample time domain feature representation is obtained. The sample time domain feature representation cannot provide oscillation information of the sample audio in the frequency domain dimension. After the sample audio is analyzed from the frequency domain dimension, the sample frequency domain feature representation is obtained. The sample frequency domain feature representation cannot provide information about a spectrum signal changing with time in the sample audio. Therefore, the sample audio is comprehensively analyzed from the time domain dimension and the frequency domain dimension by using a comprehensive dimension analysis method of the time domain dimension and the frequency domain dimension, to obtain the sample time-frequency feature representation.

Step 230. Perform frequency band segmentation on the sample time-frequency feature representation from a frequency domain dimension, to obtain time-frequency sub-feature representations respectively corresponding to at least two frequency bands.

The time-frequency sub-feature representation is a sub-feature representation distributed in a frequency band range in the sample time-frequency feature representation.

For example, a frequency band is a specified frequency range occupied by audio.

Figure 3:
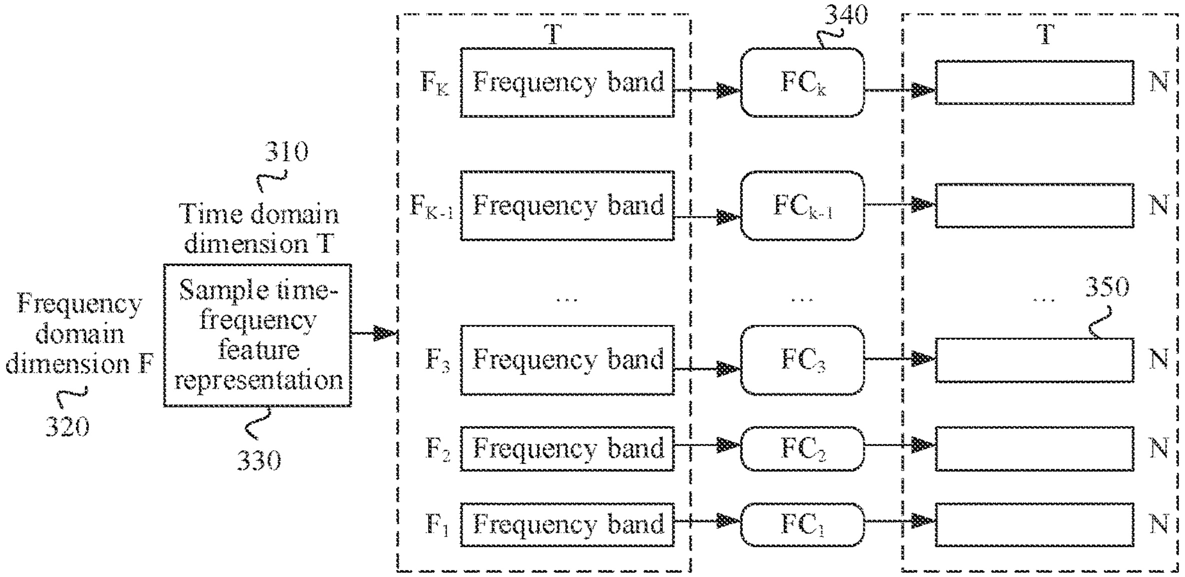
FIG. 3 is a schematic diagram of frequency band segmentation according to an exemplary embodiment of this application.

In some embodiments, as shown in FIG. 3, after the sample time-frequency feature representation corresponding to the sample audio is obtained, frequency band segmentation is performed on the sample time-frequency feature representation from a frequency domain dimension 310. In this case, a time domain dimension 320 corresponding to the sample time-frequency feature representation remains unchanged. At least two frequency bands are obtained based on a segmentation process of the sample time-frequency feature representation. The frequency band segmentation means that an entire frequency range originally occupied by the sample audio is segmented into a plurality of specified frequency ranges. The specified frequency range is less than the entire frequency range. Therefore, the specified frequency range is also referred to as a frequency band range.

For example, for an input sample time-frequency feature representation 330, the sample time-frequency feature representation 330 being referred to as X for short in this embodiment ($X \in R^{F \times T}$) F being a frequency domain dimension 310, and T being a time domain dimension 320, when the sample time-frequency feature representation 330 is segmented from the frequency domain dimension 310, the sample time-frequency feature representation 330 is segmented into K frequency bands, a dimension of each frequency band being $F_k$, and k=1, . . . , K, and meeting $\Sigma_{k=1}^{K} F_k = F$.

In some embodiments, $F_k$ and K are manually set. For example, the sample time-frequency feature representation 330 is segmented by using a same frequency band width (dimension), and frequency band widths of the K frequency bands are the same. Alternatively, the sample time-frequency feature representation 330 is segmented by using different frequency band widths, and frequency band widths of the K frequency bands are different. For example, the frequency band widths of the K frequency bands sequentially increase, or the frequency band widths of the K frequency bands are randomly selected.

Each frequency band corresponds to a time-frequency sub-feature representation. Time-frequency sub-feature representations respectively corresponding to the at least two frequency bands are determined based on the obtained at least two frequency bands, the time-frequency sub-feature representation being a sub-feature representation distributed in a frequency band range corresponding to a frequency band in the sample time-frequency feature representation.

In an embodiment, a frequency band segmentation operation of fine granularity is performed on the sample time-frequency feature representation, so that the obtained at least two frequency band have smaller frequency band widths. Through a frequency band segmentation operation of finer granularity, the time-frequency sub-feature representations respectively corresponding to the at least two frequency bands can reflect feature information within the frequency band range in more detail.

Step 240. Perform inter-frequency band relationship analysis on the time-frequency sub-feature representations respectively corresponding to the at least two frequency bands from the frequency domain dimension, and obtain an application time-frequency feature representation based on an inter-frequency band relationship analysis result.

The inter-frequency band relationship analysis is configured for indicating to perform relationship analysis on the at least two frequency bands obtained through segmentation, to determine an association relationship between the at least two frequency bands. In an example, an analysis model is pre-trained, the time-frequency sub-feature representations respectively corresponding to the at least two frequency bands are inputted into the analysis model, and an output result is used as an association relationship between the time-frequency sub-feature representations respectively corresponding to the at least two frequency bands.

In some embodiments, when an inter-frequency band relationship between the at least two frequency bands is analyzed, the inter-frequency band relationship between the at least two frequency bands is analyzed by using the time-frequency sub-feature representations respectively corresponding to the at least two frequency bands.

For example, after the time-frequency sub-feature representations respectively corresponding to the at least two frequency bands are obtained, inter-frequency band relationship analysis is performed on the time-frequency sub-feature representations respectively corresponding to the at least two frequency bands from the frequency domain dimension. For example, an additional inter-frequency band analysis network (a network module) is used as an analysis model, and inter-frequency band relationship modeling is performed on the time-frequency sub-feature representations respectively corresponding to the at least two frequency bands, to obtain an inter-frequency band relationship analysis result.

In some embodiments, the inter-frequency band relationship analysis result is represented by using a feature vector, that is, after inter-frequency band relationship analysis is performed on the time-frequency sub-feature representations respectively corresponding to the at least two frequency bands, to obtain the inter-frequency band relationship analysis result represented by using the feature vector.

In some embodiments, the inter-frequency band relationship analysis result is represented by using a specific value, that is, after inter-frequency band relationship analysis is performed on the time-frequency sub-feature representations respectively corresponding to the at least two frequency bands, to obtain a specific value to represent a degree of correlation between the time-frequency sub-feature representations respectively corresponding to the at least two frequency bands. In an example, a higher degree of correlation indicates a larger value.

In an embodiment, the application time-frequency feature representation is obtained based on the inter-frequency band relationship analysis result.

In some embodiments, the inter-frequency band relationship analysis result represented by using the feature vector is used as the application time-frequency feature representation. Alternatively, time domain relationship analysis is performed on the inter-frequency band relationship analysis result from the time domain dimension, to obtain the application time-frequency feature representation.

For example, after the application time-frequency feature representation is obtained, the application time-frequency feature representation is configured for training an audio recognition model. Alternatively, the application time-frequency feature representation is configured for performing audio separation on the sample audio, to improve quality or the like of separated audio.

The foregoing description is merely an example, and is not limited in this embodiment of this application.

Based on the foregoing, after a sample time-frequency feature representation corresponding to sample audio is extracted, frequency band segmentation is performed on the sample time-frequency feature representation from a frequency domain dimension, to obtain time-frequency sub-feature representations respectively corresponding to at least two frequency bands, so that an application time-frequency feature representation is obtained based on an inter-frequency band relationship analysis result. The frequency band segmentation process of fine granularity is performed on the sample time-frequency feature representation from the frequency domain dimension, to overcome an analysis difficulty caused by an excessively large frequency band width in a case of a wide frequency band, and an inter-frequency band relationship analysis process is also performed on the time-frequency sub-feature representations respectively corresponding to the at least two frequency bands obtained through segmentation, to cause the application time-frequency feature representation obtained based on the inter-frequency band relationship analysis result to have inter-frequency band relationship information, so that when a downstream analysis processing task is performed on the sample audio by using the application time-frequency feature representation, an analysis result with better performance can be obtained, thereby effectively expanding an application scenario of the application time-frequency feature representation.

Figure 4:
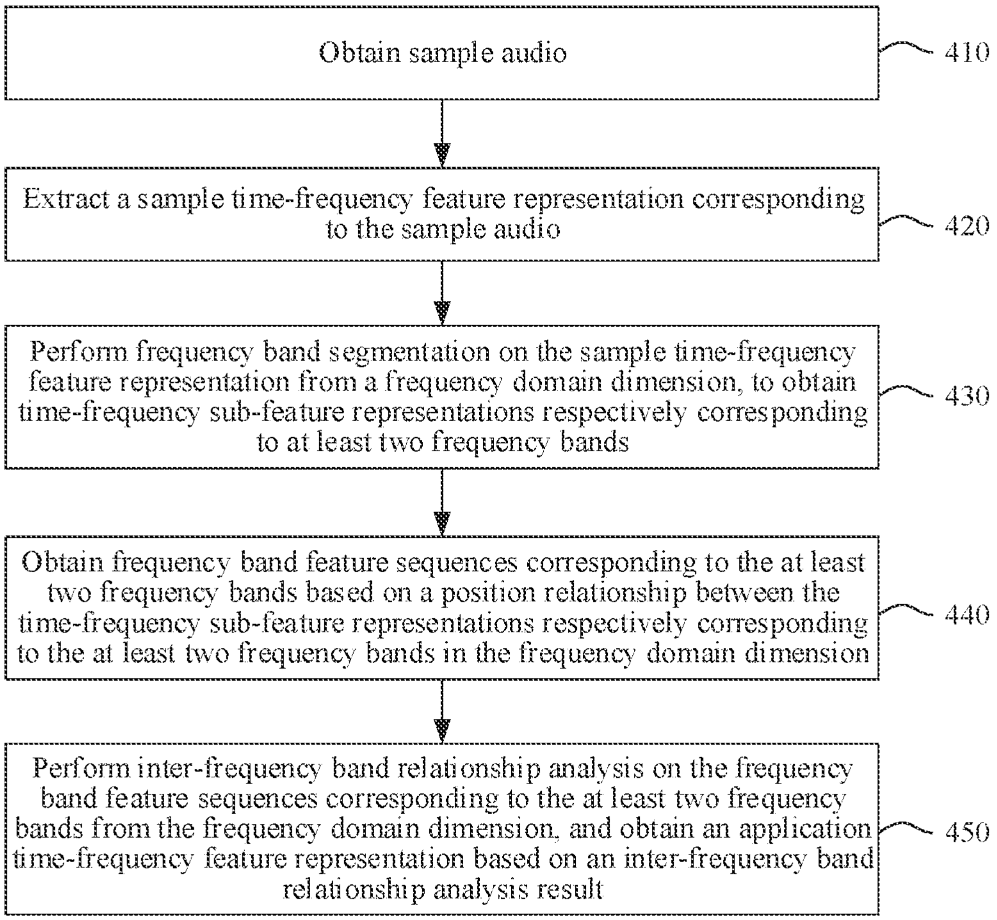
FIG. 4 is a flowchart of a method for extracting a feature representation according to another exemplary embodiment of this application.

In an embodiment, inter-frequency band relationship analysis is performed on the time-frequency sub-feature representations respectively corresponding to the at least two frequency bands by using a position relationship in the frequency domain dimension. For example, as shown in FIG. 4, the embodiment shown in FIG. 2 may also be implemented as the following step 410 to step 450.

Step 410. Obtain sample audio.

For example, audio is configured for indicating data having audio information, and the sample audio is obtained by using a voice acquisition method, a voice synthesis method, or the like.

Step 420. Extract a sample time-frequency feature representation corresponding to the sample audio.

The sample time-frequency feature representation is a feature representation obtained by performing feature extraction on the sample audio from a time domain dimension and a frequency domain dimension. The reason for extracting the sample time-frequency feature representation is that a time-frequency analysis method (for example, Fourier transform) is similar to an information extraction method of human ears for the sample audio, and different sound sources are more likely to produce significant distinctiveness in the sample time-frequency feature representation than in another type of feature representation.

In some embodiments, the sample audio is comprehensively analyzed from the time domain dimension and the frequency domain dimension, to obtain the sample time-frequency feature representation.

Step 430. Perform frequency band segmentation on the sample time-frequency feature representation from a frequency domain dimension, to obtain time-frequency sub-feature representations respectively corresponding to at least two frequency bands.

The time-frequency sub-feature representation is a sub-feature representation distributed in a frequency band range in the sample time-frequency feature representation.

In some embodiments, as shown in FIG. 3, after the sample time-frequency feature representation corresponding to the sample audio is obtained, frequency band segmentation is performed on the sample time-frequency feature representation from a frequency domain dimension 310. At least two frequency bands are obtained based on a segmentation process of the sample time-frequency feature representation.

For example, for an input sample time-frequency feature representation 330 ($X \in R^{F \times T}$), when the sample time-frequency feature representation 330 is segmented from the frequency domain dimension 310, the sample time-frequency feature representation 330 is segmented into K frequency bands by manually setting $F_k$ and K, a dimension of each frequency band being $F_k$. Based on a manually setting process, dimensions of any two frequency bands may be the same or may be different (that is, a difference between frequency band widths shown in FIG. 3).

In an embodiment, frequency band segmentation is performed on the sample time-frequency feature representation from the frequency domain dimension, to obtain frequency band features corresponding to the at least two frequency bands.

In some embodiments, as shown in FIG. 3, after the K frequency bands are obtained, the K frequency bands are respectively inputted into corresponding fully connected layers (FC layers) 340, that is, each frequency band in the K frequency bands has a corresponding fully connected layer 340, for example, a fully connected layer corresponding to $F_{k-1}$ is $FC_{k-1}$, a fully connected layer corresponding to $F_3$ is $FC_3$, a fully connected layer corresponding to $F_2$ is $FC_2$, and a fully connected layer corresponding to $F_1$ is $FC_1$.

In an embodiment, dimensions corresponding to the frequency band features are mapped to a specified feature dimension, to obtain at least two time-frequency sub-feature representations.

For example, the fully connected layer 340 is configured to map a dimension of an input frequency band from $F_k$ to a dimension N. In some embodiments, N is any dimension, for example, the dimension N is the same as a minimum dimension $F_k$; or the dimension N is the same as a maximum dimension $F_k$; or the dimension N is less than a minimum dimension $F_k$; or the dimension N is greater than a maximum dimension $F_k$; or the dimension N is the same as any dimension in a plurality of dimensions $F_k$. The dimension N is the specified feature dimension.

Mapping the dimension of the input frequency band from $F_k$ to the dimension N indicates that the fully connected layer 340 operates the corresponding input frequency band frame by frame from a time domain dimension T. In some embodiments, the K frequency bands are respectively processed by using the fully connected layers 340 by using corresponding dimension processing methods according to a difference of the dimension N.

For example, when the dimension N is less than the minimum dimension $F_k$, dimension reduction processing is performed on the K frequency bands. For example, dimension reduction processing is performed by the fully connected layers FC. Alternatively, when the dimension N is greater than the maximum dimension $F_k$, dimension raising processing is performed on the K frequency bands. For example, dimension raising processing is performed by using an interpolation method. Alternatively, when the dimension N is the same as any dimension in the plurality of dimensions $F_k$, the plurality of dimensions $F_k$ are mapped to the dimension N through dimension reduction processing or dimension raising processing, so that dimensions corresponding to the K frequency bands are the same, that is, all the dimensions respectively corresponding to the K frequency bands are the dimension N.

The foregoing description is merely an example, and is not limited in this embodiment of this application.

In some embodiments, a feature representation corresponding to the dimension N after dimension transformation is used as a time-frequency sub-feature representation. Each frequency band corresponds to a time-frequency sub-feature representation, the time-frequency sub-feature representation being a sub-feature representation distributed in a frequency band range corresponding to a frequency band in the sample time-frequency feature representation. Different frequency bands correspond to a same dimension, and feature dimensions of the at least two time-frequency sub-feature representations are the same. For example, based on a specified feature dimension (N), different time-frequency sub-feature representations may be analyzed by using a same analysis method, for example, analyzed by using a same model, to reduce a calculation amount of model analysis.

Step 440. Obtain frequency band feature sequences corresponding to the at least two frequency bands based on a position relationship between the time-frequency sub-feature representations respectively corresponding to the at least two frequency bands in the frequency domain dimension.

In some embodiments, after the time-frequency sub-feature representations respectively corresponding to the at least two frequency bands are obtained, frequency band feature sequences corresponding to the at least two frequency bands are determined based on a position relationship between frequency bands.

For example, after at least two time-frequency sub-feature representations corresponding to the dimension N are obtained, an inter-frequency band relationship is determined based on a position relationship between frequency bands corresponding to different time-frequency sub-feature representations, and the inter-frequency band relationship is represented by using a frequency band feature sequence. The frequency band feature sequence is configured for representing a sequence distribution relationship between the at least two frequency bands from the frequency domain dimension.

In an embodiment, the frequency band feature sequences corresponding to the at least two frequency bands are determined based on a frequency size relationship between the time-frequency sub-feature representations respectively corresponding to the at least two frequency bands in the frequency domain dimension.

Figure 5:
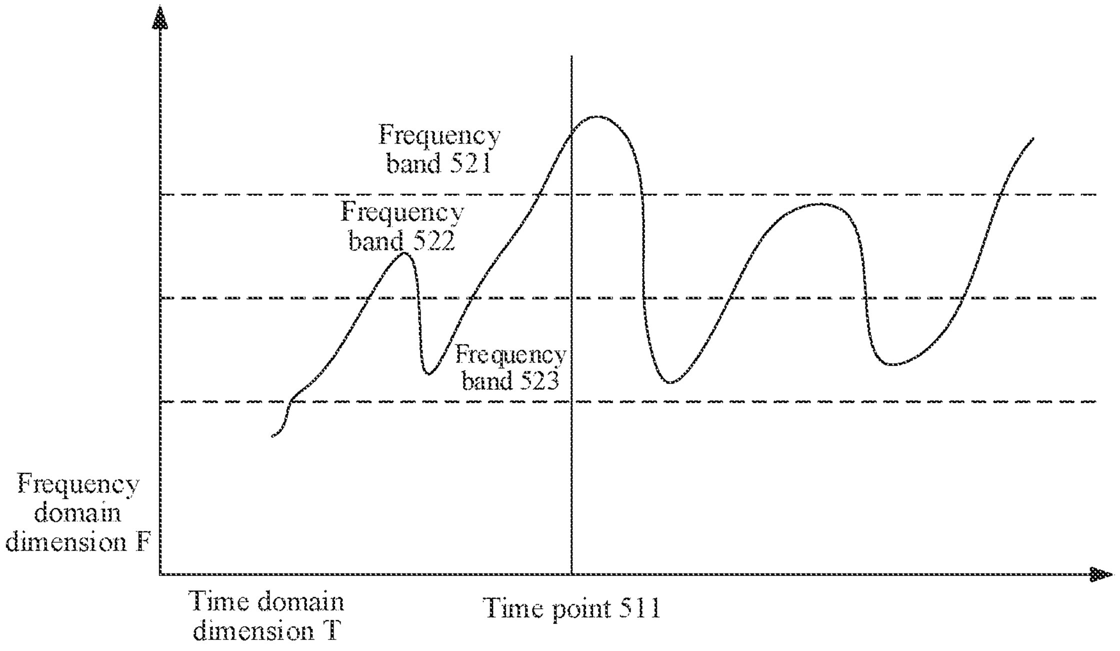
FIG. 5 is a schematic diagram of inter-frequency band relationship analysis according to an exemplary embodiment of this application.

For example, FIG. 5 is a schematic diagram of a frequency change from a time domain dimension 510 and a frequency domain dimension 520. When the time-frequency sub-feature representation is analyzed from the frequency domain dimension 520, change statuses of frequency sizes of different frequency bands are determined in each frame (a time point corresponding to each time domain dimension). For example, at a time point 511, a change status of a frequency size of a frequency band 521, a change status of a frequency size of a frequency band 522, and a change status of a frequency size of a frequency band 523 are determined.

In this embodiment, frequency band feature sequences corresponding to different frequency bands are determined according to a frequency size relationship between time-frequency sub-feature representations respectively corresponding to different frequency bands in the frequency domain dimension, so that the obtained frequency band feature sequence has a frequency correlation of the time-frequency sub-feature representation in the frequency domain dimension, thereby improving accuracy of obtaining the frequency band feature sequence.

Based on a frequency size included in the time-frequency sub-feature representation in the frequency domain dimension, when changes of frequency sizes of different frequency bands are determined, frequency band feature sequences corresponding to at least two frequency bands are determined. The frequency band feature sequence includes a frequency size corresponding to the frequency band, that is, frequency band feature sequences respectively corresponding to different frequency bands are determined.

Step 450. Perform inter-frequency band relationship analysis on the frequency band feature sequences respectively corresponding to the at least two frequency bands from the frequency domain dimension, and obtain an application time-frequency feature representation based on an inter-frequency band relationship analysis result.

For example, as shown in FIG. 5, after frequency sizes of different frequency bands are determined, frequency band feature sequences respectively corresponding to different frequency bands are obtained. In some embodiments, inter-frequency band relationship analysis is performed on the frequency band feature sequences corresponding to the at least two frequency bands from a frequency domain dimension 520, to determine change statuses of frequency sizes. For example, at the time point 511, after the frequency sizes of the frequency band 521, the frequency band 522, and the frequency band 523 are determined, the change statuses of the frequency sizes of the frequency band 521, the frequency band 522, and the frequency band 523 are determined. That is, inter-frequency band relationship analysis is performed on the frequency band feature sequences of different frequency bands, to determine an inter-frequency band relationship analysis result.

In this embodiment, frequency band feature sequences corresponding to different frequency bands are obtained by using a position relationship between time-frequency sub-feature representations respectively corresponding to different frequency bands in the frequency domain dimension, and inter-frequency band relationship analysis is performed on the frequency band feature sequences from the frequency domain dimension, to obtain an application time-frequency feature representation, so that the finally obtained application time-frequency feature representation can include a correlation between different frequency bands in the frequency domain dimension, thereby improving accuracy and comprehensiveness of obtaining the feature representation.

In an embodiment, the frequency band feature sequences corresponding to the at least two frequency bands are inputted into a frequency band relationship network, and an inter-frequency band relationship analysis result is outputted.

The frequency band relationship network is a network that is pre-trained for performing inter-frequency band relationship analysis.

For example, after the frequency band feature sequences respectively corresponding to the at least two frequency bands are obtained, the frequency band feature sequences respectively corresponding to the at least two frequency bands are inputted into the frequency band relationship network, the frequency band relationship network analyzes the frequency band feature sequences respectively corresponding to the at least two frequency bands, and a model result outputted by the frequency band relationship network is used as the inter-frequency band relationship analysis result.

In some embodiments, the frequency band relationship network is a learnable modeling network. The frequency band feature sequences respectively corresponding to the at least two frequency bands are inputted into a frequency band relationship modeling network, and the frequency band relationship modeling network performs inter-frequency band relationship modeling according to the frequency band feature sequences respectively corresponding to the at least two frequency bands, and determines an inter-frequency band relationship between the frequency band feature sequences respectively corresponding to the at least two frequency bands when performing modeling, to obtain the inter-frequency band relationship analysis result. That is, the frequency band relationship modeling network is a learnable frequency band relationship network. When a relationship between different frequency bands is learned by using the frequency band relationship modeling network, the inter-frequency band relationship analysis result can be determined, and the frequency band relationship modeling network can also be learned and trained (the training process is a parameter update process).

In some embodiments, the frequency band relationship network is a network that is pre-trained for performing inter-frequency band relationship analysis. For example, the frequency band relationship network is a pre-trained network. After the frequency band feature sequences corresponding to the at least two frequency bands are inputted into the frequency band relationship network, the frequency band relationship network analyzes the frequency band feature sequences corresponding to the at least two frequency bands, to obtain the inter-frequency band relationship analysis result.

For example, the inter-frequency band relationship analysis result is represented by using a feature vector or a matrix. The foregoing description is merely an example, and is not limited in this embodiment of this application.

In this embodiment, a frequency band feature sequence corresponding to a frequency band is inputted into the pre-trained frequency band relationship network to obtain an inter-frequency band relationship analysis result, so that manual analysis can be replaced with model prediction, to improve result output efficiency and accuracy.

In an embodiment, the inter-frequency band relationship analysis result is used as the application time-frequency feature representation. Alternatively, time domain relationship analysis is performed on the inter-frequency band relationship analysis result from the time domain dimension, to obtain the application time-frequency feature representation. The application time-frequency feature representation is configured for a downstream analysis processing task applicable to the sample audio.

For example, after the application time-frequency feature representation is obtained, the application time-frequency feature representation is configured for training an audio recognition model. Alternatively, the application time-frequency feature representation is configured for performing audio separation on the sample audio, to improve quality or the like of separated audio.

Based on the foregoing, after a sample time-frequency feature representation corresponding to sample audio is extracted, a frequency band segmentation process of fine granularity is performed on the sample time-frequency feature representation from a frequency domain dimension, to overcome an analysis difficulty caused by an excessively large frequency band width in a case of a wide frequency band, and an inter-frequency band relationship analysis process is also performed on time-frequency sub-feature representations respectively corresponding to at least two frequency bands obtained through segmentation, to cause an application time-frequency feature representation obtained based on an inter-frequency band relationship analysis result to have inter-frequency band relationship information, so that when a downstream analysis processing task is performed on the sample audio by using the application time-frequency feature representation, an analysis result with better performance can be obtained, thereby effectively expanding an application scenario of the application time-frequency feature representation.

In this embodiment of this application, after frequency band segmentation of fine granularity is performed on the sample time-frequency feature representation from the frequency domain dimension, the time-frequency sub-feature representations respectively corresponding to the at least two frequency bands are obtained. Then, the frequency band feature sequences corresponding to the at least two frequency bands are obtained by using the position relationship between the time-frequency sub-feature representations respectively corresponding to the at least two frequency bands in the frequency domain dimension, and inter-frequency band relationship analysis is performed on the frequency band feature sequences corresponding to the at least two frequency bands from the frequency domain dimension, so that the application time-frequency feature representation is obtained based on the inter-frequency band relationship analysis result. Because different frequency bands in the sample audio have a specific correlation, the application time-frequency feature representation obtained based on frequency band correlation can more accurately reflect audio information of the sample audio, so that when a downstream analysis processing task is performed on the sample audio, a better audio analysis result can be obtained.

Figure 6:
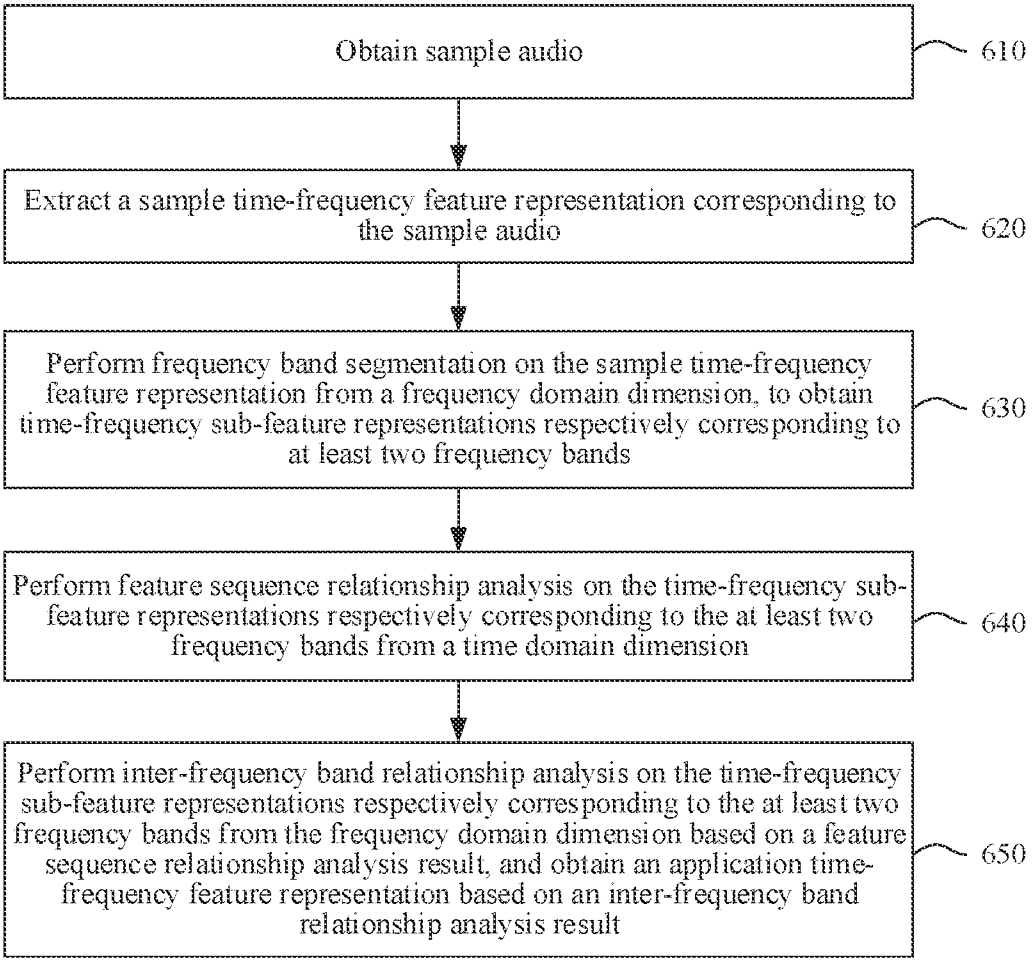
FIG. 6 is a flowchart of a method for extracting a feature representation according to another exemplary embodiment of this application.

In an embodiment, in addition to performing inter-frequency band relationship analysis on the time-frequency sub-feature representations respectively corresponding to the at least two frequency bands, feature sequence relationship analysis is further performed on the time-frequency sub-feature representations respectively corresponding to the at least two frequency bands. For example, as shown in FIG. 6, after the time-frequency sub-feature representations respectively corresponding to the at least two frequency bands are analyzed in the time domain dimension, an example of analysis in the frequency domain dimension is used for description. The embodiment shown in FIG. 2 may also be implemented as the following step 610 to step 650.

Step 610. Obtain sample audio.

For example, audio is configured for indicating data having audio information. For example, the sample audio is obtained by using a voice acquisition method, a voice synthesis method, or the like. In some embodiments, the sample audio is data obtained from a pre-stored sample audio data set.

For example, step 610 is described in detail in step 210. Details are not described herein again.

Step 620. Extract a sample time-frequency feature representation corresponding to the sample audio.

The sample time-frequency feature representation is a feature representation obtained by performing feature extraction on the sample audio from a time domain dimension and a frequency domain dimension.

For example, step 620 is described in detail in step 220. Details are not described herein again.

Step 630. Perform frequency band segmentation on the sample time-frequency feature representation from a frequency domain dimension, to obtain time-frequency sub-feature representations respectively corresponding to at least two frequency bands.

The time-frequency sub-feature representation is a sub-feature representation distributed in a frequency band range in the sample time-frequency feature representation.

In an embodiment, frequency band segmentation is performed on the sample time-frequency feature representation from the frequency domain dimension, to obtain frequency band features respectively corresponding to at least two frequency bands, and the frequency band features are mapped to a specified feature dimension, to obtain feature representations corresponding to the specified feature dimension.

In this embodiment, feature dimensions corresponding to the frequency band features obtained through frequency band segmentation are mapped to a specified feature dimension to obtain time-frequency sub-feature representations, so that different frequency bands can be mapped to a same feature dimension, to improve accuracy of the time-frequency sub-feature representation.

For example, as shown in FIG. 3, dimensions of corresponding input frequency bands are mapped from $F_k$ to a dimension N through different fully connected layers 340, to obtain at least two frequency bands having a same dimension of N. Each frequency band in the at least two frequency bands corresponds to a feature representation 350 corresponding to a specified feature dimension, the dimension N being the specified feature dimension.

In an embodiment, the frequency band features are mapped to the specified feature dimension, to obtain feature representations corresponding to the specified feature dimension. A tensor transformation operation is performed on the feature representations corresponding to the specified feature dimension, to obtain at least two time-frequency sub-feature representations.

Figure 7:
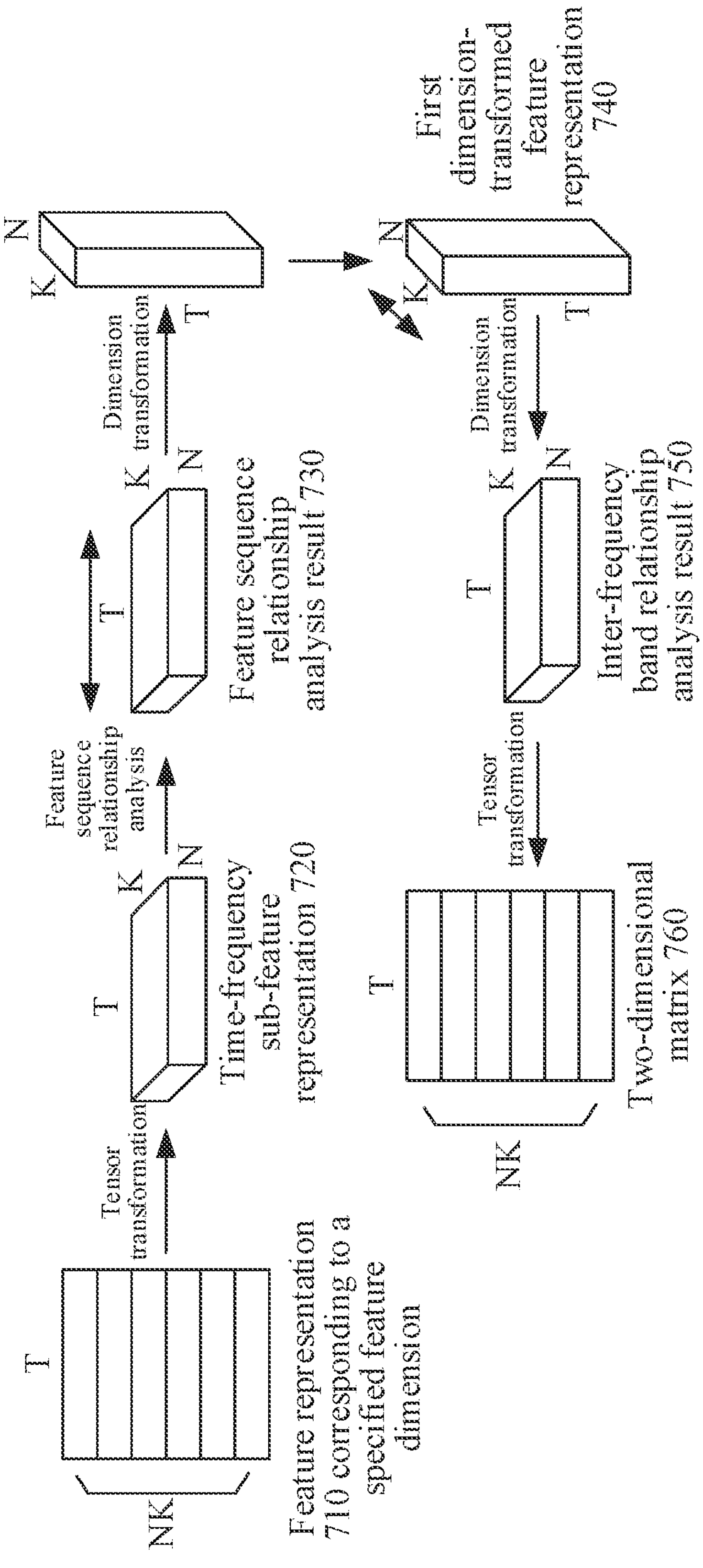
FIG. 7 is a flowchart of feature processing according to an exemplary embodiment of this application.

For example, as shown in FIG. 7, after feature representations 710 corresponding to a specified feature dimension and respectively corresponding to at least two frequency bands are obtained, a tensor transformation operation is performed on at least two feature representations 710 corresponding to the specified feature dimension, to obtain time-frequency sub-feature representations corresponding to the at least two feature representations 710 corresponding to the specified feature dimension, that is, obtain at least two time-frequency sub-feature representations.

In some embodiments, the tensor transformation operation is performed on the feature representations 710 corresponding to the specified feature dimension, so that the feature representations 710 corresponding to the specified feature dimension are converted into a three-dimensional tensor $H \in R^{K \times T \times N}$, K being a quantity of frequency bands, T being a time domain dimension, and N being a frequency domain dimension. For example, features obtained by performing the tensor transformation operation on the feature representations 710 corresponding to the specified feature dimension are used as at least two time-frequency sub-feature representations 720. That is, after matrix transformation is performed on the feature representations 710 corresponding to the specified feature dimension, a two-dimensional matrix is converted into a three-dimensional matrix, so that a three-dimensional matrix corresponding to the at least two time-frequency sub-feature representations 720 includes information about the at least two time-frequency sub-feature representations.

In this embodiment, the frequency band feature is mapped to the specified feature dimension, to obtain the feature representation corresponding to the specified feature dimension, and the tensor transformation operation is performed on the feature representation corresponding to the specified feature dimension, so that the time-frequency sub-feature representation in the specified feature dimension can be finally obtained.

Step 640. Perform feature sequence relationship analysis on the time-frequency sub-feature representations respectively corresponding to the at least two frequency bands from a time domain dimension, to obtain a feature sequence relationship analysis result.

The feature sequence relationship analysis result is configured for indicating feature change statuses of the time-frequency sub-feature representations respectively corresponding to the at least two frequency bands in time domain.

For example, after the time-frequency sub-feature representations respectively corresponding to the at least two frequency bands are obtained, feature sequence relationship analysis is performed on the time-frequency sub-feature representations respectively corresponding to the at least two frequency bands from the time domain dimension, to determine feature change statuses of at least two time-frequency sub-feature representations in time domain.

In an embodiment, a time-frequency sub-feature representation in each frequency band in the at least two frequency bands is inputted into a sequence relationship network, a feature distribution status of the time-frequency sub-feature representation in each frequency band in time domain is analyzed, and a feature sequence relationship analysis result is outputted.

In some embodiments, the sequence relationship network is a learnable modeling network. A time-frequency sub-feature representation in each frequency band in the at least two frequency bands is inputted into a sequence relationship modeling network, and the sequence relationship modeling network performs sequence relationship modeling on distribution of the time-frequency sub-feature representation in each frequency band in time domain, and determines a distribution status of the time-frequency sub-feature representation in each frequency band in time domain when performing modeling, to obtain the feature sequence relationship analysis result. That is, the sequence relationship modeling network is a learnable sequence relationship network. When the distribution status of the time-frequency sub-feature representation in each frequency band in time domain is learned by using the sequence relationship modeling network, the feature sequence relationship analysis result can be determined, and the sequence relationship modeling network can also be learned and trained (a parameter update process).

In some embodiments, the sequence relationship network is a network that is pre-trained for performing feature sequence relationship analysis. For example, the sequence relationship network is a pre-trained network. After a time-frequency sub-feature representation in each frequency band in the at least two frequency bands is inputted into the sequence relationship network, and the sequence relationship network analyzes distribution of the time-frequency sub-feature representation in each frequency band in time domain, to obtain a feature sequence relationship analysis result.

For example, the feature sequence relationship analysis result is represented by using a feature vector. The foregoing description is merely an example, and is not limited in this embodiment of this application.

In this embodiment, a time-frequency sub-feature representation in each frequency band in different frequency bands is inputted into a pre-trained sequence relationship network, so that manual analysis can be replaced with model analysis, to improve feature sequence relationship analysis result output efficiency and accuracy.

For example, as shown in FIG. 7, after the at least two time-frequency sub-feature representations 720 in which the three-dimensional tensor $H \in R^{K \times T \times N}$ is converted are obtained, a time-frequency sub-feature representation in each frequency band is inputted into the sequence relationship network, that is, sequence modeling is performed on a feature sequence $H_k \in R^{T \times N}$ corresponding to each frequency band from the time domain dimension T by using the sequence relationship modeling network.

In some embodiments, processed K feature sequences are re-spliced into the three-dimensional tensor $M \in R^{T \times K \times N}$ to obtain a feature sequence relationship analysis result 730.

In an embodiment, a network parameter of the sequence relationship modeling network is shared by a feature sequence corresponding to each frequency band feature, that is, the time-frequency sub-feature representation corresponding to each frequency band is analyzed by using a same network parameter, and a feature sequence relationship analysis result is determined, so as to reduce a quantity of network parameters of the sequence relationship modeling network used for obtaining the feature sequence relationship analysis result and calculation complexity.

Step 650. Perform inter-frequency band relationship analysis on the time-frequency sub-feature representations respectively corresponding to the at least two frequency bands from the frequency domain dimension based on the feature sequence relationship analysis result, and obtain an application time-frequency feature representation based on an inter-frequency band relationship analysis result.

In some embodiments, after the feature sequence relationship analysis result is obtained based on the time domain dimension, frequency domain analysis is performed on the feature sequence relationship analysis result from the frequency domain dimension, and an inter-frequency band relationship corresponding to the feature sequence relationship analysis result is determined, so that the sample time-frequency feature representation is comprehensively analyzed from the time domain dimension and the frequency domain dimension.

In this embodiment, feature sequence relationship analysis is performed on time-frequency sub-feature representations respectively corresponding to different frequency bands from the time domain dimension, to obtain a feature sequence relationship analysis result, and inter-frequency band relationship analysis is performed on the time-frequency sub-feature representations according to the feature sequence relationship analysis result, so that a finally obtained application time-frequency feature representation includes a correlation between different frequency bands in time domain, thereby improving accuracy of the application time-frequency feature representation.

In an embodiment, dimension transformation is performed on a feature representation corresponding to the feature sequence relationship analysis result, to obtain a first dimension-transformed feature representation.

The first dimension-transformed feature representation is a feature representation obtained by adjusting the time-frequency sub-feature representation in a direction of the time domain dimension.

For example, as shown in FIG. 7, after the feature sequence relationship analysis result 730 is obtained, dimension transformation is performed on a feature representation corresponding to the feature sequence relationship analysis result 730, to obtain a first dimension-transformed feature representation 740. For example, matrix transformation is performed on the feature representation corresponding to the feature sequence relationship analysis result 730, to obtain the first dimension-transformed feature representation 740.

In an embodiment, inter-frequency band relationship analysis is performed on a time-frequency sub-feature representation in the first dimension-transformed feature representation from the frequency domain dimension, and the application time-frequency feature representation is obtained based on the inter-frequency band relationship analysis result.

For example, as shown in FIG. 7, the first dimension-transformed feature representation 740 is analyzed from the frequency domain dimension, that is, inter-frequency band relationship modeling is performed on a feature sequence $M_t \in R^{K\times N}$ corresponding to each frame (a time point corresponding to each time domain dimension) from the frequency domain dimension K by using an inter-frequency band relationship modeling network, and processed T frames of features are re-splice into the three-dimensional tensor $\hat{H} \in R^{K\times T\times N}$, to obtain an inter-frequency band relationship analysis result 750.

In some embodiments, dimension transformation is performed on the inter-frequency band relationship analysis result 750 represented by using the three-dimensional tensor in a direction of the frequency domain dimension in a splicing manner, to output a two-dimensional matrix 760 whose dimension is consistent with a dimension before dimension transformation is performed.

In this embodiment, dimension transformation is performed on the feature representation corresponding to the feature sequence relationship analysis result, to obtain the first dimension-transformed feature representation, and inter-frequency band relationship analysis is performed on a time-frequency sub-feature representation in the first dimension-transformed feature representation from the frequency domain dimension, so that accuracy of the finally obtained application time-frequency feature representation in the time domain dimension can be improved.

In an embodiment, the process of analyzing the time-frequency sub-feature representations respectively corresponding to the at least two frequency bands from the time domain dimension and the frequency domain dimension can be repeated for a plurality of times. For example, processes of performing sequence relationship modeling from the time domain dimension and performing inter-frequency band relationship modeling from the frequency domain dimension are repeated for a plurality of times.

In some embodiments, an output $\hat{H} \in R^{K\times T\times N}$ of the process shown in FIG. 7 is used as an input of a next process, and the sequence relationship modeling operation and the inter-frequency band relationship modeling operation are performed again. For example, in the modeling process of different rounds, whether network parameters of the sequence relationship modeling network and the inter-frequency band relationship modeling network are shared is determined according to a specific condition.

For example, in any modeling process, the network parameter of the sequence relationship modeling network and the network parameter of the inter-frequency band relationship modeling network are shared. Alternatively, the network parameter of the sequence relationship modeling network is shared, and the network parameter of the inter-frequency band relationship modeling network is not shared. Alternatively, the network parameter of the sequence relationship modeling network is not shared, but the network parameter of the inter-frequency band relationship modeling network is shared. Specific designs of the sequence relationship modeling network and the inter-frequency band relationship modeling network are not limited in this embodiment of this application, and any network structure that can accept a sequence feature as an input and generates a sequence feature as an output can be used in the above modeling processes. The foregoing description is merely an example, and is not limited in this embodiment of this application.

In an embodiment, after inter-frequency band relationship analysis is performed on the time-frequency sub-feature representations respectively corresponding to the at least two frequency bands from the frequency domain dimension, the time-frequency sub-feature representations respectively corresponding to the at least two frequency bands are restored to feature dimensions corresponding to frequency band features based on the inter-frequency band relationship analysis result.

For example, as shown in FIG. 7, after the two-dimensional matrix 760 corresponding to the inter-frequency band relationship analysis result 750 is obtained, the time-frequency sub-feature representations respectively corresponding to the at least two frequency bands are processed based on the two-dimensional matrix 760. As shown in FIG. 7, after an output result corresponding to FIG. 7 is obtained, based on a requirement in which an output time-frequency feature representation and an input time-frequency feature representation need to have a same dimension (a same frequency domain dimension F and a same time domain dimension T) of an audio processing task (for example, voice enhancement or voice separation), the time-frequency sub-feature representations 710 corresponding to processed frequency bands represented by the two-dimensional matrix 760 shown in FIG. 7 are transformed, so that the time-frequency sub-feature representations 710 respectively corresponding to the at least two processed frequency bands are restored to corresponding input dimensions.

In some embodiments, for time-frequency sub-feature representations respectively corresponding to K processed frequency bands shown in FIG. 7, time-frequency sub-feature representations 710 respectively corresponding to at least two processed frequency bands are respectively processed by using K transformation networks 720, the transformation network being represented as $Net_k$, k=1, . . . , K, and modeling is performed on a time-frequency sub-feature representation corresponding to each processed frequency band, to map a feature dimension from N to $F_k$.

In an embodiment, a frequency band splicing operation is performed on frequency bands corresponding to the frequency band features based on the feature dimensions corresponding to the frequency band features, to obtain the application time-frequency feature representation.

In some embodiments, after the processed time-frequency sub-feature representations whose dimensions are consistent with dimensions before dimension transformation is performed are outputted, a frequency band splicing operation is performed on frequency bands corresponding to the processed time-frequency sub-feature representations, to obtain the application time-frequency feature representation. For example, as shown in FIG. 7, frequency band splicing is performed on K mapped sequence features in a direction of the frequency domain dimension, to obtain a final application time-frequency feature representation 730. In some embodiments, the application time-frequency feature representation 730 is represented as $Y \in R^{F \times T}$.

In this embodiment, the time-frequency sub-feature representations are first restored to the feature dimensions corresponding to the frequency band features, and a splicing operation is performed on frequency bands corresponding to the frequency band features, to obtain the application time-frequency feature representation, thereby improving diversity of an obtaining manner of the application time-frequency feature representation.

The foregoing description is merely an example, and is not limited in this embodiment of this application.

Based on the foregoing, after a sample time-frequency feature representation corresponding to sample audio is extracted, a frequency band segmentation process of fine granularity is performed on the sample time-frequency feature representation from a frequency domain dimension, to overcome an analysis difficulty caused by an excessively large frequency band width in a case of a wide frequency band, and an inter-frequency band relationship analysis process is also performed on time-frequency sub-feature representations respectively corresponding to at least two frequency bands obtained through segmentation, to cause an application time-frequency feature representation obtained based on an inter-frequency band relationship analysis result to have inter-frequency band relationship information, so that when a downstream analysis processing task is performed on the sample audio by using the application time-frequency feature representation, an analysis result with better performance can be obtained, thereby effectively expanding an application scenario of the application time-frequency feature representation.

In this embodiment of this application, in addition to performing inter-frequency band relationship analysis on the time-frequency sub-feature representations respectively corresponding to the at least two frequency bands, feature sequence relationship analysis is further performed on the time-frequency sub-feature representations respectively corresponding to the at least two frequency bands. That is, after frequency band segmentation of fine granularity is performed on the sample time-frequency feature representation from the frequency domain dimension to obtain the time-frequency sub-feature representations respectively corresponding to the at least two frequency bands, feature sequence relationship analysis is performed on the time-frequency sub-feature representations respectively corresponding to the at least two frequency bands from the time domain dimension, and then inter-frequency band relationship analysis is performed on the feature sequence relationship analysis result from the frequency domain dimension, so that the sample audio is analyzed more comprehensively from the time domain dimension and the frequency domain dimension. In addition, when the sample audio is analyzed by using a sequence relationship modeling network, a quantity of model parameters and calculation complexity are greatly reduced.

Figure 8:
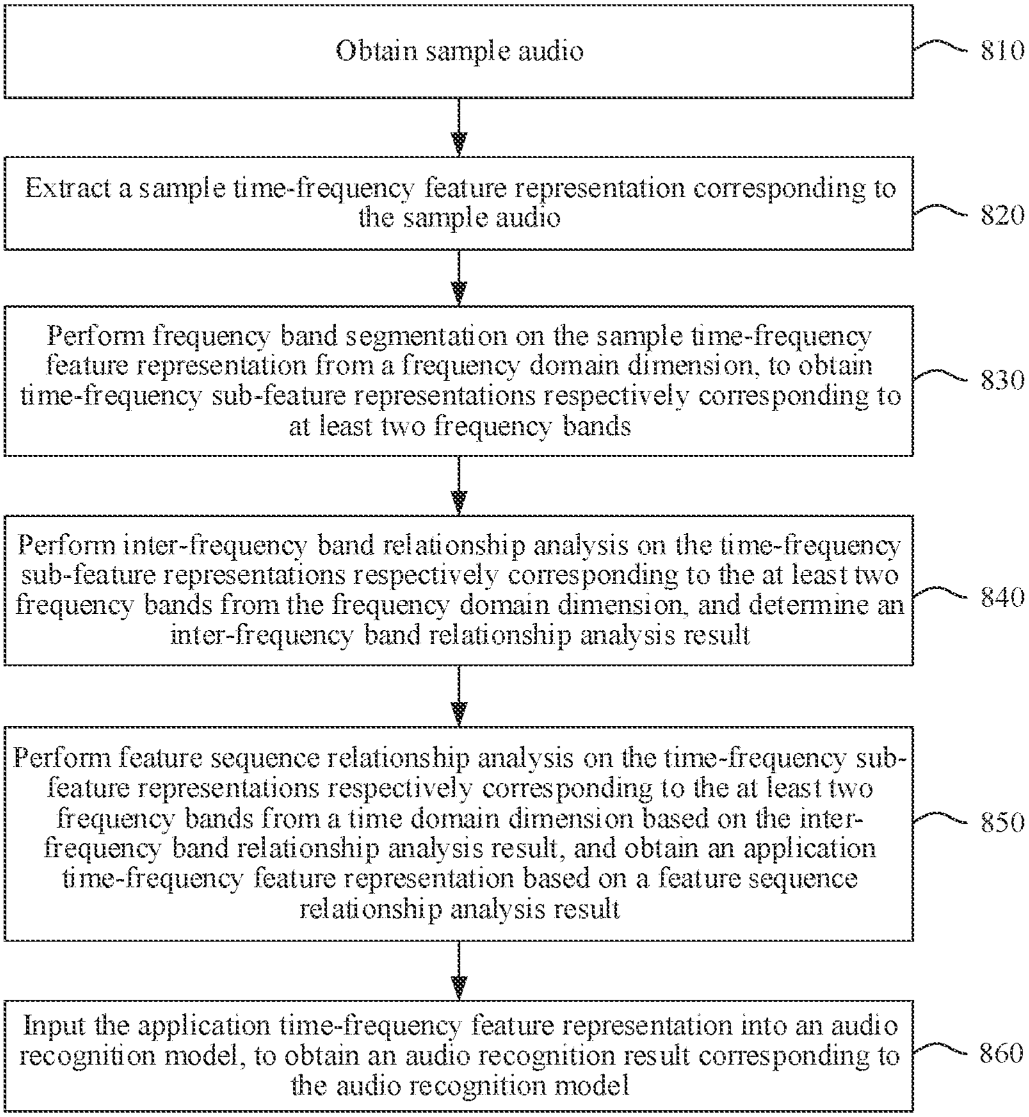
FIG. 8 is a flowchart of a method for extracting a feature representation according to another exemplary embodiment of this application.

In an embodiment, in addition to performing inter-frequency band relationship analysis on the time-frequency sub-feature representations respectively corresponding to the at least two frequency bands, feature sequence relationship analysis is further performed on the time-frequency sub-feature representations respectively corresponding to the at least two frequency bands. For example, as shown in FIG. 8, after the time-frequency sub-feature representations respectively corresponding to the at least two frequency bands are analyzed in the frequency domain dimension, an example of analysis in the time domain dimension is used for description. The embodiment shown in FIG. 2 may also be implemented as the following step 810 to step 860.

Step 810. Obtain sample audio.

Audio is configured for indicating data having audio information. In some embodiments, the sample audio is obtained by using a voice acquisition method, a voice synthesis method, or the like.

For example, step 810 is described in detail in step 210. Details are not described herein again.

Step 820. Extract a sample time-frequency feature representation corresponding to the sample audio.

The sample time-frequency feature representation is a feature representation obtained by performing feature extraction on the sample audio from a time domain dimension and a frequency domain dimension.

For example, step 820 is described in detail in step 220. Details are not described herein again.

Step 830. Perform frequency band segmentation on the sample time-frequency feature representation from a frequency domain dimension, to obtain time-frequency sub-feature representations respectively corresponding to at least two frequency bands.

The time-frequency sub-feature representation is a sub-feature representation distributed in a frequency band range in the sample time-frequency feature representation.

For example, as shown in FIG. 3, dimensions of corresponding input frequency bands are mapped from $F_k$ to a dimension N through different fully connected layers 340, to obtain at least two frequency bands having a same dimension of N. Each frequency band in the at least two frequency bands corresponds to a feature representation 350 corresponding to a specified feature dimension, the dimension N being the specified feature dimension.

For example, as shown in FIG. 7, after feature representations 710 corresponding to a specified feature dimension and respectively corresponding to at least two frequency bands are obtained, a tensor transformation operation is performed on at least two feature representations 710 corresponding to the specified feature dimension, to obtain time-frequency sub-feature representations corresponding to the at least two feature representations 710 corresponding to the specified feature dimension. The tensor transformation operation is performed on the feature representations 710 corresponding to the specified feature dimension, so that the feature representations 710 corresponding to the specified feature dimension is transformed into a three-dimensional tensor $H \in R^{K \times T \times N}$. Features obtained by performing the tensor transformation operation on the feature representations 710 corresponding to the specified feature dimension are used as at least two time-frequency sub-feature representations 720, so that a three-dimensional matrix corresponding to the at least two time-frequency sub-feature representations 720 includes information about the at least two time-frequency sub-feature representations.

Step 840. Perform inter-frequency band relationship analysis on the time-frequency sub-feature representations respectively corresponding to the at least two frequency bands from the frequency domain dimension, and determine an inter-frequency band relationship analysis result.

For example, after the time-frequency sub-feature representations respectively corresponding to the at least two frequency bands are obtained, inter-frequency band relationship analysis is performed on the time-frequency sub-feature representations respectively corresponding to the at least two frequency bands from the frequency domain dimension, to determine feature change statuses of at least two time-frequency sub-feature representations in different frequency bands.

In an embodiment, a time-frequency sub-feature representation in each frequency band in the at least two frequency bands is inputted into a frequency band relationship network, a distribution relationship of the time-frequency sub-feature representation in each frequency band in frequency domain is analyzed, and an inter-frequency band relationship analysis result is outputted, the frequency band relationship network being a network that is pre-trained for performing inter-frequency band relationship analysis.

In some embodiments, the frequency band relationship network is a learnable modeling network. The frequency band feature sequences respectively corresponding to the at least two frequency bands are inputted into a frequency band relationship modeling network, and the frequency band relationship modeling network performs inter-frequency band relationship modeling according to the frequency band feature sequences respectively corresponding to the at least two frequency bands, and determines an inter-frequency band relationship between the frequency band feature sequences respectively corresponding to the at least two frequency bands when performing modeling, to obtain the inter-frequency band relationship analysis result.

In some embodiments, the frequency band relationship network is a pre-trained network for performing inter-frequency band relationship analysis. After the frequency band feature sequences corresponding to the at least two frequency bands are inputted into the frequency band relationship network, the frequency band relationship network analyzes the frequency band feature sequences corresponding to the at least two frequency bands, to obtain the inter-frequency band relationship analysis result.

In this embodiment, the time-frequency sub-feature representations are inputted into a pre-trained frequency band relationship network, so that manual analysis is replaced with network analysis, to improve inter-frequency band relationship analysis result output efficiency and accuracy.

Step 850. Perform feature sequence relationship analysis on the time-frequency sub-feature representations respectively corresponding to the at least two frequency bands from a time domain dimension based on the inter-frequency band relationship analysis result, and obtain an application time-frequency feature representation based on a feature sequence relationship analysis result.

In some embodiments, after the inter-frequency band relationship analysis result is obtained based on the frequency domain dimension, time domain analysis is performed on the inter-frequency band relationship analysis result from the time domain dimension, and a sequence relationship corresponding to the inter-frequency band relationship analysis result is determined, so that the sample time-frequency feature representation is comprehensively analyzed from the time domain dimension and the frequency domain dimension.

In this embodiment, inter-frequency band relationship analysis is performed on the time-frequency sub-feature representations, so that the application time-frequency feature representation is obtained according to the inter-frequency band relationship analysis result, thereby improving accuracy of the application time-frequency feature representation.

In an embodiment, dimension transformation is performed on a feature representation corresponding to the inter-frequency band relationship analysis result, to obtain a second dimension-transformed feature representation.

The second dimension-transformed feature representation is a feature representation obtained by adjusting the time-frequency sub-feature representation in a direction of the frequency domain dimension.

In an embodiment, feature sequence relationship analysis is performed on a time-frequency sub-feature representation in the second dimension-transformed feature representation from the time domain dimension, and the application time-frequency feature representation is obtained based on a feature sequence relationship analysis result.

In this embodiment, dimension transformation is performed on the inter-frequency band relationship analysis result, to obtain the second dimension-transformed feature representation, and feature sequence relationship analysis is performed on a time-frequency sub-feature representation in the second dimension-transformed feature representation from the time domain dimension, so that accuracy of the finally outputted application time-frequency feature representation can be improved.

That is, the process of comprehensively analyzing the sample time-frequency feature representation from the time domain dimension and the frequency domain dimension includes: analyzing the sample time-frequency feature representation from the time domain dimension to obtain the feature sequence relationship analysis result, and then analyzing the feature sequence relationship analysis result from the frequency domain dimension to obtain the application time-frequency feature representation; or includes: analyzing the sample time-frequency feature representation from the frequency domain dimension to obtain the inter-frequency band relationship analysis result, and analyzing the inter-frequency band relationship analysis result from the time domain dimension, to obtain the application time-frequency feature representation.

The application time-frequency feature representation is configured for a downstream analysis processing task applicable to the sample audio.

In an embodiment, the method for extracting a feature representation is applicable to music separation and voice enhancement tasks.

For example, a bidirectional long short-term memory network (BLSTM) is used as a structure of a sequence relationship modeling network and inter-frequency band relationship modeling network, and a multilayer perceptron (MLP) including one hidden layer is used as a structure of the transformation network shown in FIG. 8.

In some embodiments, for a music separation task, a sampling rate of input audio is 44.1 kHz A sample time-frequency feature of the input audio is extracted through short time Fourier transform with a window length of 4096 sampling points and frame skipping of 512 sampling points. In this case, a corresponding frequency dimension F is 2049. Then, the sample time-frequency feature is segmented into 28 frequency bands with frequency band widths $F_k$ being respectively 10, 10, 10, 10, 10, 10, 10, 10, 10, 10, 93, 93, 93, 93, 93, 93, 93, 93, 93, 93, 93, 93, 93, 93, 93, 186, 186, and 182.

In some embodiments, for a voice enhancement task, a sampling rate of input audio is 16 kHz A sample time-frequency feature of the input audio is extracted through short time Fourier transform with a window length of 512 sampling points and frame skipping of 128 sampling points. In this case, a corresponding frequency dimension F is 257. The sample time-frequency feature is segmented into 12 frequency bands with frequency band widths $F_k$ being respectively 16, 16, 16, 16, 16, 16, 16, 16, 32, 32, 32, and 33.

For example, as shown in Table 1, the method for extracting a feature representation provided in this embodiment of this application is compared with a method for extracting a feature representation in the related art.

TABLE 1

| Model | Human voice SDR | Accompaniment SDR |
|---|---|---|
| XX model | 7.6 | 13.8 |
| D3Net | 7.2 | — |
| Hybrid Demucs | 8.1 | — |
| ResUNet | 9.0 | 14.8 |
| Method in this application | 9.6 | 16.1 |

Table 1 shows performance of different models in the music separation task. The XX model is a randomly selected baseline model. The baseline model is a model configured to compare an effect of the method for extracting a feature representation provided in this embodiment with an effect of the method provided in the related art. D3Net is a densely connected multi-dilated network (DenseNet) for music source separation. Hybrid Demucs is a hybrid decomposition network. ResUNet is a deep learning framework for semantic segmentation of remotely sensed data. In some embodiments, a signal to distortion ratio (SDR) is used as an indicator to compare quality of human voice and accompaniment that are extracted by different models. A larger value of the SDR indicates better quality of the extracted human voice and accompaniment. Therefore, the quality of the human voice and the accompaniment that are extracted by using the method for extracting a feature representation provided in this embodiment of this application greatly exceeds that extracted by a related model structure.

For example, Table 2 shows performance of different models in the voice enhancement task. DCCRN is a deep complex convolution recurrent network, and CLDNN is a compute library for a deep neural network.

In some embodiments, a scale invariant SDR (SISDR) is used as an indicator. A larger value of the SISDR indicates stronger performance in the voice enhancement task. Therefore, the method for extracting a feature representation provided in this embodiment of this application is also significantly superior to another baseline model.

TABLE 2

| Model | Model size | SISDR |
|---|---|---|
| DCCRN | 3.1M | 15.2 |
| CLDNN | 3.3M | 15.9 |
| Method in this application | 3.1M | 16.2 |

The foregoing is merely an example. The foregoing network structure is also applicable to other audio processing task than the music separation task and the voice enhancement task. This is not limited in this embodiment of this application.

Step 860. Input the application time-frequency feature representation into an audio recognition model, to obtain an audio recognition result corresponding to the audio recognition model.

For example, the audio recognition model is a pre-trained recognition model and correspondingly has at least one of voice recognition functions such as an audio separation function and an audio enhancement function.

In some embodiments, after sample audio is processed by using the method for extracting a feature representation, an obtained application time-frequency feature representation is inputted into an audio recognition model, and the audio recognition model performs an audio processing operation such as audio separation or audio enhancement on the sample audio according to the application time-frequency feature representation.

In an embodiment, an example in which the audio recognition model is implemented as the audio separation function is used for description.

Audio separation is a classic and important signal processing problem. An objective of the audio separation is to separate required audio content from acquired audio data and eliminate other unwanted background audio interference. For example, sample audio on which audio separation is to be performed is used as a target music, audio separation on the target music is implemented as music source separation, which refers to obtaining sounds such as human voice and accompaniment from mixed audio according to requirements of different fields, and further includes obtaining sound of a single musical instrument from the mixed audio, that is, performing a music separation process by using different musical instruments as different sound sources.

By using the method for extracting a feature representation, after feature extraction is performed on the target music from a time domain dimension and a frequency domain dimension to obtain a time-frequency feature representation, frequency band segmentation of finer granularity is performed on the time-frequency feature representation from the frequency domain dimension, and inter-frequency band relationship analysis is also performed on time-frequency sub-feature representations respectively corresponding to a plurality of frequency bands from the frequency domain dimension, to obtain an application time-frequency feature representation including inter-frequency band relationship information. The extracted application time-frequency feature representation is inputted into the audio recognition model, and the audio recognition model performs audio separation on the target music according to the application time-frequency feature representation. For example, human voice, bass voice, and piano voice are obtained from the target music through separation. For example, different voice corresponds to different tracks outputted by the audio recognition model. Because the application time-frequency feature representation extracted by using the method for extracting a feature representation effectively uses the inter-frequency band relationship information, the audio recognition model can more significantly distinguish different sound sources, effectively improve an effect of music separation, and obtain a more accurate audio recognition result, for example, audio information corresponding to a plurality of sound sources.

In an embodiment, an example in which the audio recognition model is implemented as the audio enhancement function is used for description.

Audio enhancement refers to eliminating all kinds of noise interference in an audio signal as much as possible, and extracting audio information in the audio signal as pure as possible from noise background. An example in which audio in which audio enhancement is to be performed is sample audio is used for description.

By using the method for extracting a feature representation, after feature extraction is performed on the sample audio from a time domain dimension and a frequency domain dimension to obtain a time-frequency feature representation, frequency band segmentation of finer granularity is performed on the time-frequency feature representation from the frequency domain dimension to obtain a plurality of frequency bands corresponding to different sound sources, and inter-frequency band relationship analysis is also performed on time-frequency sub-feature representations respectively corresponding to the plurality of frequency bands from the frequency domain dimension, to obtain an application time-frequency feature representation including inter-frequency band relationship information. The extracted application time-frequency feature representation is inputted into the audio recognition model, and the audio recognition model performs audio enhancement on the sample audio according to the application time-frequency feature representation. For example, the sample audio is voice audio recorded in a noisy situation, and audio information of different types can be effectively separated in the application time-frequency feature representation obtained by using the method for extracting a feature representation. Based on relatively poor correlation before and after noise, the audio recognition model can more significantly distinguish different sound sources and more accurately determine a difference between noise and effective voice information, to effectively improve audio enhancement performance, and obtain an audio recognition result with a better audio enhancement effect, for example, voice audio obtained through noise reduction.

The foregoing description is merely an example, and is not limited in this embodiment of this application.

Based on the foregoing, after a sample time-frequency feature representation corresponding to sample audio is extracted, a frequency band segmentation process of fine granularity is performed on the sample time-frequency feature representation from a frequency domain dimension, to overcome an analysis difficulty caused by an excessively large frequency band width in a case of a wide frequency band, and an inter-frequency band relationship analysis process is also performed on time-frequency sub-feature representations respectively corresponding to at least two frequency bands obtained through segmentation, to cause an application time-frequency feature representation obtained based on an inter-frequency band relationship analysis result to have inter-frequency band relationship information.

In this embodiment of this application, sequence modeling in a direction of the time domain dimension and inter-frequency band relationship modeling from the frequency domain dimension are performed alternately, to obtain the application time-frequency feature representation, so that when a downstream analysis processing task is performed on the sample audio, an analysis result with better performance can be obtained, thereby effectively expanding an application scenario of the application time-frequency feature representation.

Figure 9:
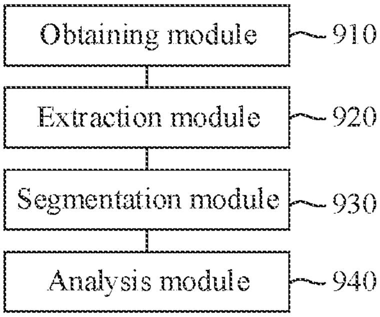
FIG. 9 is a structural block diagram of an apparatus for extracting a feature representation according to an exemplary embodiment of this application.

FIG. 9 is an apparatus for extracting a feature representation according to an exemplary embodiment of this application. As shown in FIG. 9, the apparatus includes:

- an obtaining module 910, configured to obtain sample audio;
- an extraction module 920, configured to extract a sample time-frequency feature representation corresponding to the sample audio, the sample time-frequency feature representation being a feature representation obtained by performing feature extraction on the sample audio from a time domain dimension and a frequency domain dimension, the time domain dimension being a dimension in which a signal change occurs in the sample audio over time, and the frequency domain dimension being a dimension in which a signal change occurs in the sample audio in frequency;
- a segmentation module 930, configured to perform frequency band segmentation on the sample time-frequency feature representation from the frequency domain dimension, to obtain time-frequency sub-feature representations respectively corresponding to at least two frequency bands, the time-frequency sub-feature representation being a sub-feature representation distributed within a frequency band range in the sample time-frequency feature representation; and
- an analysis module 940, configured to perform inter-frequency band relationship analysis on the time-frequency sub-feature representations respectively corresponding to the at least two frequency bands from the frequency domain dimension, and obtain an application time-frequency feature representation based on an inter-frequency band relationship analysis result, the application time-frequency feature representation being a feature representation applicable to a downstream analysis processing task of the sample audio.

In an embodiment, the analysis module 940 is further configured to obtain frequency band feature sequences corresponding to the at least two frequency bands based on a position relationship between the time-frequency sub-feature representations respectively corresponding to the at least two frequency bands in the frequency domain dimension, the frequency band feature sequence being configured for representing a sequence distribution relationship between the at least two frequency bands from the frequency domain dimension; and perform the inter-frequency band relationship analysis on the frequency band feature sequences corresponding to the at least two frequency bands from the frequency domain dimension, and obtain the application time-frequency feature representation based on the inter-frequency band relationship analysis result.

In an embodiment, the analysis module 940 is further configured to determine the frequency band feature sequences corresponding to the at least two frequency bands based on a frequency size relationship between the time-frequency sub-feature representations respectively corresponding to the at least two frequency bands in the frequency domain dimension.

In an embodiment, the analysis module 940 is further configured to input the frequency band feature sequences corresponding to the at least two frequency bands into a frequency band relationship network, and output the inter-frequency band relationship analysis result, the frequency band relationship network being a network that is pre-trained for performing inter-frequency band relationship analysis.

In an embodiment, the analysis module 940 is further configured to perform feature sequence relationship analysis on the time-frequency sub-feature representations respectively corresponding to the at least two frequency bands from the time domain dimension, to obtain a feature sequence relationship analysis result, the feature sequence relationship analysis result being configured for indicating feature change statuses of the time-frequency sub-feature representations respectively corresponding to the at least two frequency bands in time domain; and perform inter-frequency band relationship analysis on the time-frequency sub-feature representations respectively corresponding to the at least two frequency bands from the frequency domain dimension based on the feature sequence relationship analysis result, and obtain the application time-frequency feature representation based on the inter-frequency band relationship analysis result.

In an embodiment, the analysis module 940 is further configured to perform dimension transformation on a feature representation corresponding to the feature sequence relationship analysis result, to obtain a first dimension-transformed feature representation, the first dimension-transformed feature representation being a feature representation obtained by adjusting the time-frequency sub-feature representation in a direction of the time domain dimension; and perform inter-frequency band relationship analysis on a time-frequency sub-feature representation in the first dimension-transformed feature representation from the frequency domain dimension, and obtain the application time-frequency feature representation based on the inter-frequency band relationship analysis result.

In an embodiment, the analysis module 940 is further configured to input a time-frequency sub-feature representation in each frequency band in the at least two frequency bands into a sequence relationship network, analyze a feature distribution status of the time-frequency sub-feature representation in each frequency band in time domain, and output the feature sequence relationship analysis result, the sequence relationship network being a network that is pre-trained for performing feature sequence relationship analysis.

In an embodiment, the segmentation module 930 is further configured to perform frequency band segmentation on the sample time-frequency feature representation from the frequency domain dimension, to obtain frequency band features respectively corresponding to the at least two frequency bands; and map feature dimensions corresponding to the frequency band features to a specified feature dimension, to obtain at least two time-frequency sub-feature representations, feature dimensions of the at least two time-frequency sub-feature representations being the same.

In an embodiment, the segmentation module 930 is further configured to map the frequency band features to the specified feature dimension, to obtain feature representations corresponding to the specified feature dimension; and perform a tensor transformation operation on the feature representations corresponding to the specified feature dimension, to obtain the at least two time-frequency sub-feature representations.

In an embodiment, the analysis module 940 is further configured to perform inter-frequency band relationship analysis on the time-frequency sub-feature representations respectively corresponding to the at least two frequency bands from the frequency domain dimension, and determine the inter-frequency band relationship analysis result; and perform feature sequence relationship analysis on the time-frequency sub-feature representations respectively corresponding to the at least two frequency bands from the time domain dimension based on the inter-frequency band relationship analysis result, and obtain the application time-frequency feature representation based on a feature sequence relationship analysis result.

In an embodiment, the analysis module 940 is further configured to perform dimension transformation on a feature representation corresponding to the inter-frequency band relationship analysis, to obtain a second dimension-transformed feature representation, the second dimension-transformed feature representation being a feature representation obtained by adjusting the time-frequency sub-feature representation in a direction of the frequency domain dimension; and perform feature sequence relationship analysis on a time-frequency sub-feature representation in the second dimension-transformed feature representation from the time domain dimension, and obtain the application time-frequency feature representation based on the feature sequence relationship analysis result.

In an embodiment, the analysis module 940 is further configured to input a time-frequency sub-feature representation in each frequency band in the at least two frequency bands into a frequency band relationship network, analyze a distribution relationship of the time-frequency sub-feature representation in each frequency band in frequency domain, and output the inter-frequency band relationship analysis result, the frequency band relationship network being a network that is pre-trained for performing inter-frequency band relationship analysis.

In an embodiment, the analysis module 940 is further configured to restore the time-frequency sub-feature representations respectively corresponding to the at least two frequency bands to feature dimensions corresponding to frequency band features based on the inter-frequency band relationship analysis result; and perform a frequency band splicing operation on frequency bands corresponding to the frequency band features based on the feature dimensions corresponding to the frequency band features, to obtain the application time-frequency feature representation.

Based on the foregoing, after a sample time-frequency feature representation corresponding to sample audio is extracted, frequency band segmentation is performed on the sample time-frequency feature representation from a frequency domain dimension, to obtain time-frequency sub-feature representations respectively corresponding to at least two frequency bands, and an application time-frequency feature representation is obtained based on an inter-frequency band relationship analysis result. Through the apparatus, a frequency band segmentation process of fine granularity is performed on the sample time-frequency feature representation from the frequency domain dimension, to overcome an analysis difficulty caused by an excessively large frequency band width in a case of a wide frequency band, and an inter-frequency band relationship analysis process is also performed on the time-frequency sub-feature representations respectively corresponding to the at least two frequency bands obtained through segmentation, to cause the application time-frequency feature representation obtained based on the inter-frequency band relationship analysis result to have inter-frequency band relationship information, so that when a downstream analysis processing task is performed on the sample audio by using the application time-frequency feature representation, an analysis result with better performance can be obtained, thereby effectively expanding an application scenario of the application time-frequency feature representation.

The apparatus for extracting a feature representation provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the apparatus for extracting a feature representation provided in the foregoing embodiments and the method embodiments for extracting a feature representation fall within a same conception. For details of a specific implementation process, refer to the method embodiments. Details are not described herein again.

Figure 10:
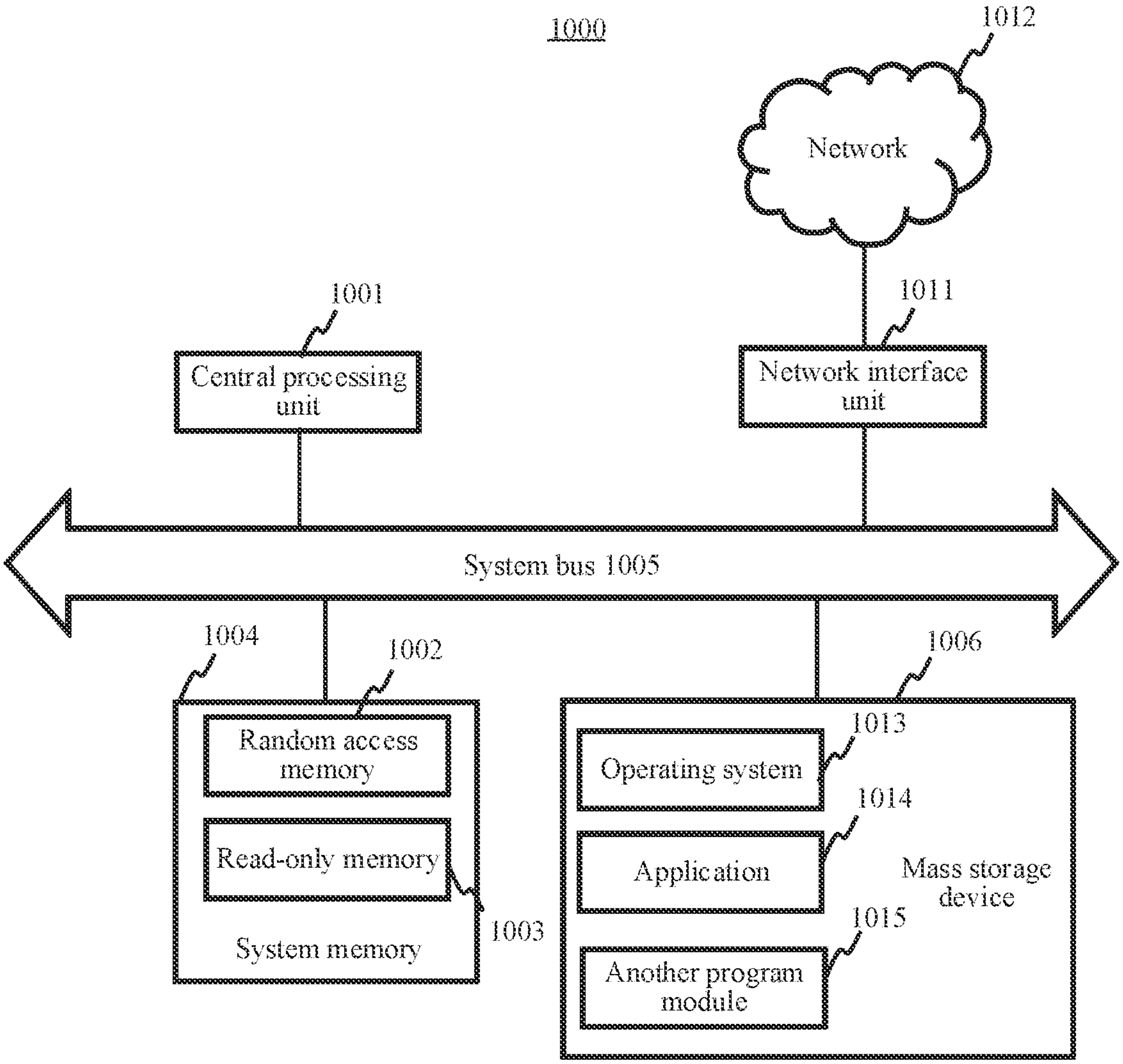
FIG. 10 is a structural block diagram of a server according to an exemplary embodiment of this application.

FIG. 10 is a schematic structural diagram of a server 1000 according to an exemplary embodiment of this application. The server 1000 includes a central processing unit (CPU) 1001, a system memory 1004 including a random access memory (RAM) 1002 and a read-only memory (ROM) 1003, and a system bus 1005 connecting the system memory 1004 to the CPU 1001. The server 1000 further includes a mass storage device 1006 configured to store an operating system 1013, an application 1014, and another program module 1015.

The mass storage device 1006 is connected to the central processing unit 1001 by using a mass storage controller (not shown) that is connected to the system bus 1005. The mass storage device 1006 and a computer readable medium associated with the mass storage device provide non-volatile storage for the server 1000. That is, the mass storage device 1006 may include a computer-readable medium (not shown) such as a hard disk or a compact disc read only memory (CD-ROM) drive.

Generally, the computer readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may know that the computer storage medium is not limited to the foregoing types. The system memory 1004 and the mass storage device 1006 may be collectively referred to as a memory.

According to various embodiments of this application, the server 1000 may further be connected, by using a network such as the Internet, to a remote computer on the network and run. That is, the server 1000 may be connected to a network 1012 through a network interface unit 1011 that is connected to the system bus 1005, or may be connected to a network of another type or a remote computer system (not shown) by using the network interface unit 1011.

The memory further includes one or more programs, which are stored in the memory and are configured to be executed by the CPU.

An embodiment of this application further provides a computer device. The computer device includes processor and a memory. The memory stores at least one instruction, at least one program, a code set, or an instruction set. The at least one instruction, the at least one program, the code set, or the instruction set is loaded and executed by the processor to implement the method for extracting a feature representation according to the foregoing method embodiments.

An embodiment of this application further provides a computer-readable storage medium, having at least one instruction, at least one segment of program, a code set or an instruction set stored therein, the at least one instruction, the at least one segment of program, the code set or the instruction set being loaded and executed by the processor to implement the method for extracting a feature representation according to the foregoing method embodiments.

An embodiment of this application further provides a computer program product or a computer program, including computer instructions, and the computer instructions being stored in a computer-readable storage medium. A processor of a computer device reads the computer instructions from the computer-readable storage medium and executes the computer instructions to cause the computer device to perform the method for extracting a feature representation described in any one of the foregoing embodiments.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for description purpose but do not imply the preference among the embodiments.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for extracting a feature representation from an audio signal performed by a computer device, the method comprising:

obtaining sample audio;

performing feature extraction on the sample audio from a time domain dimension and a frequency domain dimension to obtain a sample time-frequency feature representation corresponding to the sample audio;

performing frequency band segmentation on the sample time-frequency feature representation to obtain time-frequency sub-feature representations respectively corresponding to at least two frequency bands;

performing feature sequence relationship analysis on the time-frequency sub-feature representations respectively corresponding to the at least two frequency bands along the time domain dimension to obtain an analyzed feature representation;

performing dimension transformation on the analyzed feature representation to obtain a first dimension-transformed feature representation, wherein the first dimension-transformed feature representation is a feature representation obtained by adjusting a direction of the time domain dimension in a time-frequency sub-feature representation in the first dimension-transformed feature representation;

performing inter-frequency band relationship analysis on the time-frequency sub-feature representation in the first dimension-transformed feature representation along the frequency domain dimension to obtain an inter-frequency band relationship analysis result; and obtaining a target time-frequency feature representation based on the inter-frequency band relationship analysis result, wherein the target time-frequency feature representation is used for a downstream analysis processing task applied to the sample audio.

2. The method according to claim 1, wherein the performing inter-frequency band relationship analysis comprises:

obtaining frequency band feature sequences corresponding to the at least two frequency bands based on a position relationship between the time-frequency sub-feature representations respectively corresponding to the at least two frequency bands; and performing inter-frequency band relationship analysis on the frequency band feature sequences corresponding to the at least two frequency bands.

3. The method according to claim 2, wherein the obtaining frequency band feature sequences corresponding to the at least two frequency bands based on a position relationship between the time-frequency sub-feature representations respectively corresponding to the at least two frequency bands comprises:

determining the frequency band feature sequences corresponding to the at least two frequency bands based on a frequency size relationship between the time-frequency sub-feature representations respectively corresponding to the at least two frequency bands.

4. The method according to claim 2, wherein the inter-frequency band relationship analysis is performed by a pre-trained frequency band relationship network.

5. The method according to claim 1, wherein the performing inter- frequency band relationship analysis comprises:

performing inter-frequency band relationship analysis on the time-frequency sub-feature representations respectively corresponding to the at least two frequency bands based on a result of the feature sequence relationship analysis result.

6. The method according to claim 1, wherein the performing frequency band segmentation on the sample time-frequency feature representation to obtain time-frequency sub-feature representations respectively corresponding to at least two frequency bands comprises:

performing frequency band segmentation on the sample time-frequency feature representation to obtain frequency band features respectively corresponding to the at least two frequency bands; and mapping feature dimensions corresponding to the frequency band features to a specified feature dimension, to obtain the time-frequency sub-feature representations respectively corresponding to the at least two frequency bands.

7. The method according to claim 1, wherein the performing inter-frequency band relationship analysis comprises:

performing feature sequence relationship analysis on the time-frequency sub-feature representations respectively corresponding to the at least two frequency bands based on the inter- frequency band relationship analysis result.

8. The method according to claim 1, wherein the method further comprises:

restoring the time-frequency sub-feature representations respectively corresponding to the at least two frequency bands to feature dimensions of frequency band features corresponding to the at least two frequency bands based on the inter-frequency band relationship analysis result; and performing a frequency band splicing operation on the at least two frequency bands corresponding to the frequency band features based on the feature dimensions corresponding to the frequency band features, to obtain the target time-frequency feature representation.

9. A computer device, comprising a processor and a memory, the memory storing at least one program, the at least one program being loaded and executed by the processor to implement a method for extracting a feature representation from an audio signal, the method including:

obtaining sample audio;

performing feature extraction on the sample audio from a time domain dimension and a frequency domain dimension to obtain a sample time-frequency feature representation corresponding to the sample audio;

performing frequency band segmentation on the sample time-frequency feature representation to obtain time-frequency sub-feature representations respectively corresponding to at least two frequency bands; and performing feature sequence relationship analysis on the time-frequency sub-feature representations respectively corresponding to the at least two frequency bands along the time domain dimension to obtain an analyzed feature representation;

performing dimension transformation on the analyzed feature representation to obtain a first dimension-transformed feature representation, wherein the first dimension-transformed feature representation is a feature representation obtained by adjusting a direction of the time domain dimension in a time-frequency sub-feature representation in the first dimension-transformed feature representation;

performing inter-frequency band relationship analysis on the time-frequency sub-feature representation in the first dimension-transformed feature representation along the frequency domain dimension to obtain an inter-frequency band relationship analysis result; and obtaining a target time-frequency feature representation based on the inter-frequency band relationship analysis result, wherein the target time-frequency feature representation is used for a downstream analysis processing task applied to the sample audio.

10. The computer device according to claim 9, wherein the performing inter-frequency band relationship analysis comprises:

obtaining frequency band feature sequences corresponding to the at least two frequency bands based on a position relationship between the time-frequency sub-feature representations respectively corresponding to the at least two frequency bands; and performing inter-frequency band relationship analysis on the frequency band feature sequences corresponding to the at least two frequency bands.

11. The computer device according to claim 10, wherein the obtaining frequency band feature sequences corresponding to the at least two frequency bands based on a position relationship between the time-frequency sub-feature representations respectively corresponding to the at least two frequency bands comprises:

determining the frequency band feature sequences corresponding to the at least two frequency bands based on a frequency size relationship between the time-frequency sub-feature representations respectively corresponding to the at least two frequency bands.

12. The computer device according to claim 10, wherein the inter- frequency band relationship analysis is performed by a pre-trained frequency band relationship network.

13. The computer device according to claim 9, wherein the performing inter-frequency band relationship analysis comprises:

performing inter-frequency band relationship analysis on the time-frequency sub-feature representations respectively corresponding to the at least two frequency bands based on a result of the feature sequence relationship analysis.

14. The computer device according to claim 9, wherein the performing frequency band segmentation on the sample time-frequency feature representation to obtain time-frequency sub- feature representations respectively corresponding to at least two frequency bands comprises:

performing frequency band segmentation on the sample time-frequency feature representation to obtain frequency band features respectively corresponding to the at least two frequency bands; and mapping feature dimensions corresponding to the frequency band features to a specified feature dimension, to obtain the time-frequency sub-feature representations respectively corresponding to the at least two frequency bands.

15. The computer device according to claim 9, wherein the performing inter-frequency band relationship analysis comprises:

performing feature sequence relationship analysis on the time-frequency sub-feature representations respectively corresponding to the at least two frequency bands based on the inter- frequency band relationship analysis result.

16. The computer device according to claim 9, wherein the method further comprises:

restoring the time-frequency sub-feature representations respectively corresponding to the at least two frequency bands to feature dimensions of frequency band features corresponding to the at least two frequency bands based on the inter-frequency band relationship analysis result; and performing a frequency band splicing operation on the at least two frequency bands corresponding to the frequency band features based on the feature dimensions corresponding to the frequency band features, to obtain the target time-frequency feature representation.

17. A non-transitory computer-readable storage medium, having at least one program stored therein, the at least one program being loaded and executed by a processor of a computer device to implement a method for extracting a feature representation from an audio signal, the method including:

obtaining sample audio;

performing feature extraction on the sample audio from a time domain dimension and a frequency domain dimension to obtain a sample time-frequency feature representation corresponding to the sample audio;

performing frequency band segmentation on the sample time-frequency feature representation to obtain time-frequency sub-feature representations respectively corresponding to at least two frequency bands; and performing feature sequence relationship analysis on the time-frequency sub-feature representations respectively corresponding to the at least two frequency bands along the time domain dimension to obtain an analyzed feature representation;

performing dimension transformation on the analyzed feature representation to obtain a first dimension-transformed feature representation, wherein the first dimension-transformed feature representation is a feature representation obtained by adjusting a direction of the time domain dimension in a time-frequency sub-feature representation in the first dimension-transformed feature representation;

performing inter-frequency band relationship analysis on the time-frequency sub-feature representation in the first dimension-transformed feature representation along the frequency domain dimension to obtain an inter-frequency band relationship analysis result; and obtaining a target time-frequency feature representation based on the inter-frequency band relationship analysis result, wherein the target time-frequency feature representation is used for a downstream analysis processing task applied to the sample audio.

18. The non-transitory computer-readable storage medium according to claim 17, wherein the performing inter-frequency band relationship analysis comprises:

obtaining frequency band feature sequences corresponding to the at least two frequency bands based on a position relationship between the time-frequency sub-feature representations respectively corresponding to the at least two frequency bands; and performing inter-frequency band relationship analysis on the frequency band feature sequences corresponding to the at least two frequency bands.

19. The non-transitory computer-readable storage medium according to claim 17, wherein the performing inter-frequency band relationship analysis comprises:

performing inter-frequency band relationship analysis on the time-frequency sub-feature representations respectively corresponding to the at least two frequency bands based on a result of the feature sequence relationship analysis.

20. The non-transitory computer-readable storage medium according to claim 17, wherein the method further comprises:

restoring the time-frequency sub-feature representations respectively corresponding to the at least two frequency bands to feature dimensions of frequency band features corresponding to the at least two frequency bands based on the inter-frequency band relationship analysis result; and performing a frequency band splicing operation on the at least two frequency bands corresponding to the frequency band features based on the feature dimensions corresponding to the frequency band features, to obtain the target time-frequency feature representation.

* * * * *